United States Patent [19]
Makino et al.

[11] Patent Number: 5,818,945
[45] Date of Patent: Oct. 6, 1998

[54] SUBBAND ECHO CANCELLATION METHOD USING PROJECTION ALGORITHM

[75] Inventors: Shoji Makino, Machida; Yoichi Haneda, Tokyo; Akira Nakagawa, Kokubunji; Masashi Tanaka, Tokorozawa; Suehiro Shimauchi; Junji Kojima, both of Tokyo, all of Japan

[73] Assignee: Nippon Telegraph and Telephone, Tokyo, Japan

[21] Appl. No.: 633,295

[22] Filed: Apr. 17, 1996

[30] Foreign Application Priority Data

Apr. 20, 1995 [JP] Japan .................................. 7-095519

[51] Int. Cl.$^6$ ....................................................... H04B 3/20
[52] U.S. Cl. .............................. 381/66; 379/410; 370/291
[58] Field of Search .......................... 381/66, 94.1, 71.1; 370/286, 291; 379/410, 406, 411

[56] References Cited

U.S. PATENT DOCUMENTS 5,272,695   12/1993   Makino et al. .

FOREIGN PATENT DOCUMENTS

412691A2   2/1991   European Pat. Off. .
412691A3   2/1991   European Pat. Off. .

OTHER PUBLICATIONS

Ozeki et al., An Adapative Filtering Algorithm Using an Orthogonal Projection to an Affine Subspace and its Properties, *Electronics and Communications In Japan*, vol. 67–A, No. 5, 1984, pp. 19–27.

*Primary Examiner*—Vivian Chang
*Attorney, Agent, or Firm*—Pollock, Vande Sande & Priddy

[57] ABSTRACT

A received signal is output to an echo path and, at the same time, it is divided into a plurality of subbands to generate subband received signals, which are applied to estimated echo paths in the respective subbands to produce echo replicas. The echo having propagated over the echo path is divided into a plurality of subbands to generate subband echoes, from which the corresponding echo replicas are subtracted to produce misalignment signals. Based on the subband received signal in each subband and the misalignment signal corresponding thereto, a coefficient to be provided to each estimated echo path is adjusted by a projection or ES projection algorithm.

9 Claims, 16 Drawing Sheets

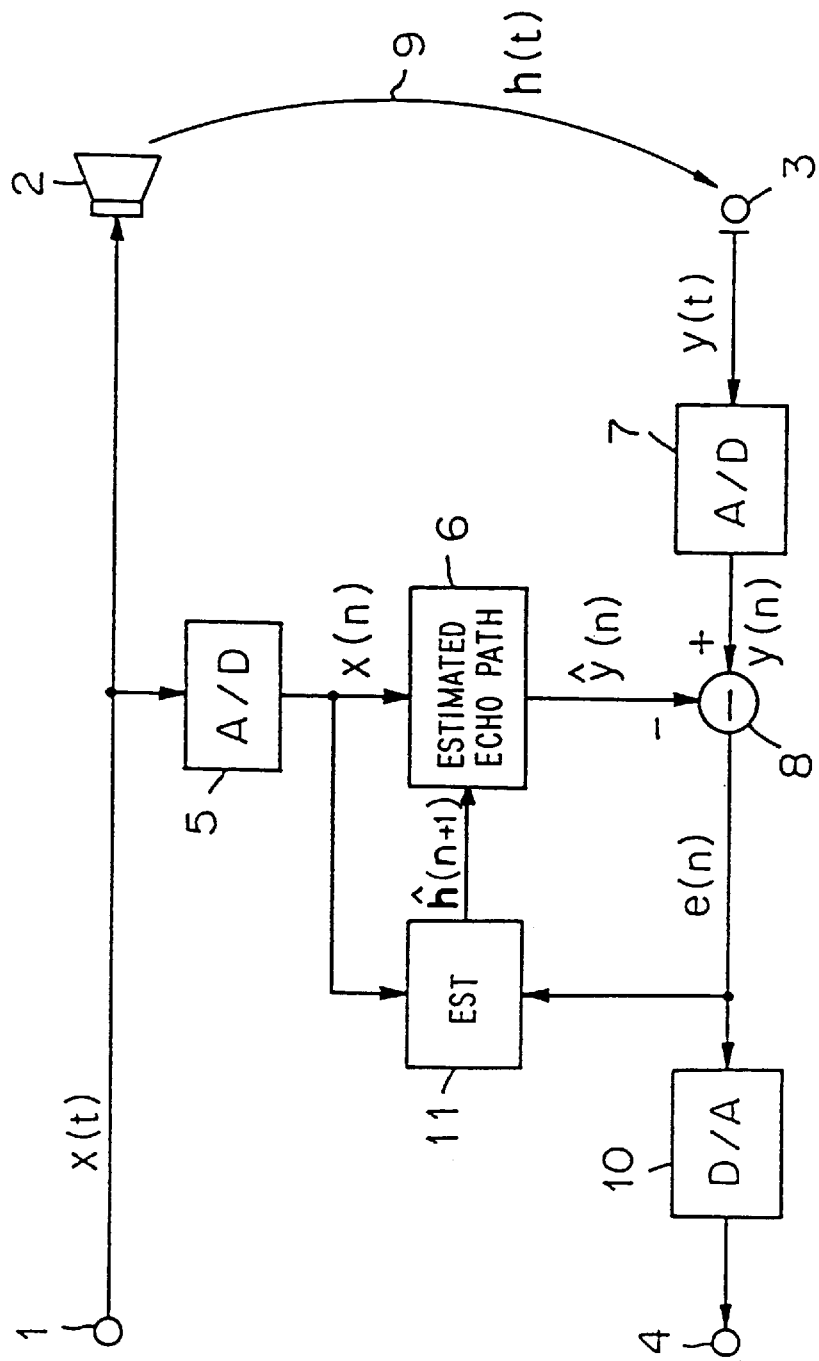

fs : SAMPLING FREQ.

SUBBAND ECHO CANCELLATION METHOD USING PROJECTION ALGORITHM

BACKGROUND OF THE INVENTION

The present invention relates to an echo cancellation method for canceling echoes that cause howling and present psycho-acoustic problems in a 2-wire/4-wire conversion and a hands-free telecommunication system and, more particularly, to a subband echo cancellation method that adjusts an estimated impulse response of an estimated echo path in each divided subband.

With the widespread use of satellite communications and audio teleconferences, there is a strong demand for telecommunication equipment which is excellent in simultaneous conversation performance and substantially free from the influence of echoes. To meet this requirement, there have been proposed echo cancelers. FIG. 1 shows, by way of example, a hands-free telecommunication system using a conventional echo canceler described in Japanese Patent Application Laid-Open Gazette No. 220530/89. In an echo canceler wherein a received signal x(t) received at a received input terminal 1 is reproduced by a loudspeaker 2 and a send signal fed to a microphone 3 is sent out via a send out terminal 4, the received signal x(t) is rendered into a sample value by an analog-to-digital (A/D) converter 5, and the received signal x(n) is fed to an estimated echo path 6 that simulates a room echo path 9, by which an echo replica ŷ(n) is generated. On the other hand, the speech recreated by the loudspeaker 2 propagates over the echo path 9 and is picked up by the microphone 3 as an echo y(t), which is rendered by an A/D converter 7 into a sample-valued echo y(n). The echo replica ŷ(n) is subtracted by a subtractor 8 from the echo y(n) to eliminate it. The resulting misalignment e(n) is fed as a residual signal to and converted by a digital-to-analog (D/A) converter 10 into an analog signal, which is provided to the send out terminal 4.

In this instance, since the impulse response h(t) of the room echo path 9 varies with a change of the sound field by, for example, the movement of a person or object in the room, the impulse response of the estimated echo path 6 also needs to be varied following temporal variations of the echo path 9 from the loudspeaker 2 to the microphone 3. In the illustrated example, the estimated echo path 6 is formed using a digital FIR filter, whose filter coefficient ĥ(n) is iteratively adjusted so that the misalignment or residual e(n)=y(n)−ŷ(n) approaches zero, by an estimation part 11 that uses a least mean squares (LMS) algorithm, normalized LMS (NLMS) algorithm, exponentially weighted step size (ES) algorithm, projection algorithm, or ES projection algorithm. By such an adjustment of the filter coefficient vector ĥ(n) that corresponds to the transfer characteristic or impulse response of the estimated echo path 6, an optimum echo cancellation is always carried out.

A gradient-type adaptive algorithm, such as the LMS, NMLS or the like, is expressed by the following equation.

$$\hat{h}(n+1)=\hat{h}(n)+\alpha[-\Delta(n)] \quad (1)$$

where $\hat{h}(n)=[\hat{h}_1(n), \hat{h}_2(n), \ldots, \hat{h}_L(n)]^T$
: coefficient vector (impulse response) of the estimated echo path (FIR filter)

$\Delta(n)$: gradient vector of (mean) squared errors $\alpha$: step size (scalar quantity)

L: number of taps $T$: transpose of the vector n: discrete time

The ES algorithm is one that extends the step size $\alpha$, conventionally given as a scalar quantity in the gradient-type adaptive algorithm, to a diagonal matrix called a step size matrix A; this algorithm is expressed by the following equation.

$$\hat{h}(n+1)=\hat{h}(n)+A[-\Delta(n)] \quad (2)$$

where $A=\text{diag}[\alpha_1, \alpha_2, \ldots, \alpha_L]$: step size matrix $\alpha_i=\alpha_0\lambda^{i-1}$ (i=1,2,..., L)

$\lambda$: attenuation rate of the impulse response variation ($0<\lambda<1$)

When the estimated echo path 6 is formed by the digital FIR filter, its filter coefficient vector ĥ(n) directly simulates the impulse response h(n) of the room echo path 9. Accordingly, the value of adjustment of the filter coefficient that is required according to variations of the room echo path 9 is equal to the variation in its impulse response h(n). Then, the step size matrix A, which represents the step size in the filter coefficient adjustment, is weighted using the time-varying characteristic of the impulse response. The impulse response variation in a room sound field is usually expressed as an exponential function using the attenuation rate $\lambda$. As depicted in FIG. 2A, the diagonal elements $\alpha i$ (where i=1,2, ..., L) of the step size matrix A exponentially attenuates, as i increases, from $\alpha_0$ and gradually approaches zero with the same gradient as that of the exponential attenuation characteristic of the impulse response. The above is described in detail in Japanese patent application laid open No.01-220530 and S. Makino, Y. Kaneda and N. Koizumi, "Exponentially weighted stepsize NLMS adaptive filter based on the statistics of a room impulse response," IEEE Trans. Speech and Audio, vol. 1, pp. 101–108, Jan. 1993. This algorithm utilizes an acoustic finding or knowledge that when the impulse response of a room echo path varies as a person or object moves, its variation (a difference in the impulse response) exponentially attenuates with the same attenuation rate as that of the impulse response. By adjusting initial coefficients of the impulse response with large variations in large steps and the subsequent coefficients with small variations in small steps, it is possible to offer an echo canceler of fast convergence.

The projection algorithm is based on an idea that improves the convergence speed for correlated signals such as speech by removing the auto-correlation between input signals in the algorithm. The removal of auto-correlated components means the whitening of signals in the time domain. The projection algorithm is described in detail in K. Ozeki and T. Umeda, "An Adaptive filtering Algorithm Using an Orthogonal Projection to an Affine Subspace and Its Properties," Trans.(A), IEICE Japan, vol.J67-A, No.2, pp.126–132, Feb. 1984. The p-order projection algorithm updates the filter coefficient vector ĥ(n) in such a manner as to obtain correct outputs y(n), y(n−1), ..., y(n−p+1) for the last p input signal vectors x(n), x(n−1), ..., x(n−p+1). That is, a filter coefficient ĥ(n+1) is computed which satisfies the following equations:

$$x(n)^T\hat{h}(n+1)=y(n) \quad (3)$$

$$x(n-1)^T\hat{h}(n+1)=y(n-1) \quad (4)$$

$$x(n-p+1)^T\hat{h}(n+1)=y(n-p+1) \quad (5)$$

where $x(n)=[x(n),x(n-1), \ldots, x(n-L+1)]^T$ Since the number p of equations is smaller than the unknown number (the number of taps) L, the solution $\hat{h}(n+1)$ of the simultaneous equations (3) to (5) is underdetermined. Hence, the filter coefficient vector is updated to minimize the value or magnitude of the updating $\|\hat{h}(n+1)-\hat{h}(n)\|$. The p-order projection algorithm in such an instance is expressed by the following equation.

$$\begin{aligned}\hat{h}(n+1) &= \hat{h}(n) + \alpha[-\Delta] \\ &= \hat{h}(n) + \alpha[X(n)^T]^+ e(n) \\ &= \hat{h}(n) + \alpha X(n) [X(n)^T X(n)]^{-1} e(n) \\ &= \hat{h}(n) + \alpha X(n) \beta(n) \\ &= \hat{h}(n) + \alpha[\beta_1 x(n) + \beta_2 x(n-1) + \ldots + \beta_p x(n-p+1)]\end{aligned} \quad (6)$$

where $X(n)=[x(n),x(n-1), \ldots, x(n-p+1)]$
$e(n)=[e(n), \ldots, (1-\alpha)^{P-1} e(n-p+1)]^T$
$e(n)=y(n)-\hat{y}(n)$
$\hat{y}(n)=\hat{h}(n)^T x(n)$
$\beta(n)=[\beta 1, \beta 2, \ldots, \beta_p]^T$
$^+$: generalized inverse matrix
$^{-1}$: inverse matrix.

In the above, $\beta(n)$ is the solution of the following simultaneous linear equation with p unknowns:

$$[X(n)^T X(n)]\beta(n)=e(n) \quad (7)$$

To avoid instability in the inverse matrix operation, a small positive constant $\delta$ may be used as follows:

$$[X(n)^T X(n)+\delta I]\beta(n)=e(n) \quad (7)'$$

where I is a unit matrix. $X(n)\beta(n)$ in Eq. (6) represents processing for removing the auto-correlation of the input signal, and hence it means whitening of the signals in the time domain. That is, the projection algorithm can be said to increase the impulse response updating speed by the whitening of the input signal in the time domain. Several fast projection algorithms have been proposed to reduce the computational complexity, and they are described in detail in Japanese Patent Application Laid-Open Gazette No. 92980/95.

The ES algorithm only reflects the variation characteristic of the echo path, whereas the projection algorithm only reflects the property of the input signal. The ES projection algorithm combines the ES and the projection algorithm and permits implementation of an echo canceler of high convergence speed through utilization of their advantages. The p-order ES projection algorithm can be expressed by the following equation.

$$\begin{aligned}\hat{h}(n+1) &= \hat{h}(n) + \mu A[-\Delta(n)] \\ &= \hat{h}(n) + \mu[\{AX(n)\}^T]^+ e(n) \\ &= \hat{h}(n) + \mu AX(n) [X(n)^T AX(n)]^{-1} e(n) \\ &= \hat{h}(n) + \mu AX(n) \beta(n) \\ &= \hat{h}(n) + \mu A[\beta_1 x(n) + \beta_2 x(n-1) + \ldots + \beta_p x(n-p+1)]\end{aligned} \quad (8)$$

where $\mu$ is the second step size (scalar quantity). In the above, $\beta(n)$ is the solution of the following simultaneous linear equation:

$$[X(n)^T AX(n)]\beta(n)=e(n) \quad (9)$$

To avoid instability in the inverse matrix operation, a small positive constant $\delta$ may be used as follows:

$$[X(n)^T AX(n)+\delta I]\beta(n)=e(n) \quad (9)'$$

where I is a unit matrix.

In FIG. 3 there is shown, by way of example, the configuration of the estimation part 11 in FIG. 1 that uses the p-order ES projection algorithm. Incidentally, the ES projection algorithm becomes the projection algorithm by setting A=I (where I is a unit matrix).

Upon each application thereto of a received signal x(n), a received signal storage part 31 generates a received signal matrix X(n) consisting of p received signal vectors x(n), x(n−1), ..., X(n−p+1). In a step size matrix storage part 32, a first step size matrix A is stored. An auto-correlation calculating part 33 calculates an auto-correlation matrix $X(n)^T AX(n)$ for the received signal matrix X(n) weighted with the first step size matrix A. The thus calculated auto-correlation matrix and the residual e(n) from a residual storage part 34 are fed to a β(n) calculating part 35, which solves the simultaneous linear equation with p unknowns (9) to obtain a constant β(n).

The step size matrix A, the received signal matrix X(n), the constant β(n) and the second step size matrix μ stored in a step size storage part 36 are provided to a adjusted vector generating part 37, which calculates the following adjusted vector:

$$\mu AX(n)\beta(n) \quad (10)$$

The output from the adjusted vector generating part 37 is fed to an adder 38, wherein it is added to the current coefficient vector $\hat{h}(n)$ from a tap coefficient storage part 39 to obtain $\hat{h}(n+1)$. The calculation result $\hat{h}(n+1)$ is provided to the estimated echo path 6 (FIG. 1) and, at the same time, it is fed to the tap coefficient storage part 39 to update the value stored therein.

By the above operation, the estimated echo path 6 is sequentially adjusted following the equation given below.

$$\hat{h}(n+1)=\hat{h}(n)+\mu AX(n)\beta(n) \quad (11)$$

Thus, the impulse response $\hat{h}(n)$ gradually approaches the impulse response h(n) of the true echo path 6.

In the case of constructing the echo canceler with multiple DSP (Digital Signal Processor) chips, the exponential decay curve of the step size $\alpha_i$ approximated stepwise and the step size $\alpha_i$ set in discrete steps with a fixed value for each chip as shown in FIG. 2B. This permits implementation of the ES projection algorithm with the computational load and storage capacity held about the same as in the case of the conventional projection algorithm. The ES projection algorithm is described in detail in Japanese Patent Application Laid-Open Gazette No. 244043/93 and S. Makino and Y. Kaneda, "Exponentially weighted step-size projection algorithm for acoustic echo cancelers", Trans. IEICE Japan, vol. E75-A, No. 11, pp. 1500–1508, Nov. 1992.

There has also been used a scheme which divides a signal into multiple subbands, then sequentially adjusts in each subband the filter coefficient of the estimated echo path 6 based on variations of the echo path 6 by such a gradient-type adaptive algorithm as the LMS algorithm, NLMS algorithm or ES algorithm, and combines and outputs residuals in the respective subbands. This is disclosed in, for instance, Makino et al. U.S. Pat. No. 5,272,695 and S. Gay and R. Mammone, "Fast converging subband acoustic echo cancellation using RAP on the $WE^R$ DSP16A", Proc. ICASSP90, pp. 1141–1144, Apr. 1990. This subband analysis scheme involves flattening or what is called whitening of signals in the frequency domain, increasing the convergence speed in the estimation of the filter coefficient of the estimated echo path at the time of variations of the echo path.

The conventional estimation algorithm for the impulse response of the echo path is used for the impulse response in the full band in the projection algorithm or ES projection algorithm. With this conventional technique, the convergence speed for the echo path variation can be increased about two to four times higher than in the case of the NLMS algorithm through the use of the second-order projection or ES projection algorithm, but the convergence would not speed up even if the order of the projection or ES projection algorithm is raised higher than second order. This is disclosed in detail in Tanaka, Makino and Kaneda, "On the order and Performance of the Projection Algorithm with Speech Input", Proc. Autumn Meet. Acoust. Society, Jpn., 1-4-14, pp. 489–490, (Oct. 1992). It is considered that this problem is attributable to the fact that the umber of taps for the impulse response of the echo path is large.

As referred to previously, the projection algorithm and the ES projection algorithm increase the convergence speed by flattening (or whitening) signals in the time domain. On the other hand, the subband analysis scheme also increases the convergence speed by flattening (or whitening) signals in the frequency domain. Accordingly, it is considered, in general, to be useless to adopt the projection or ES projection algorithm for the estimation of the echo path in the subband analysis scheme which involves the input signal whitening (flattening); hence, the subband analysis scheme uses only the LMS, NLMS and ES algorithms for the estimation of the echo path.

SUMMARY OF THE INVENTION

It is therefore an object of the present invention to provide a subband echo cancellation method which attains a convergence speed higher than in the past through the use of the projection or ES projection algorithm of high order.

According to the present invention, the subband echo cancellation method outputs a received signal to an echo path and, at the same time, inputs it into an estimated echo path to generate an echo replica and subtracts it from an echo picked up via the echo path to cancel the echo. The subband echo cancellation method of the present invention comprises the steps of:

(a) dividing the received signal and the echo into N subbands to generate N subband received signals and N subband echoes, N being an integer equal to or greater than 2;

(b) generating N echo replicas by providing the N subband received signals to N estimated echo paths each formed by a digital filter which is given a filter coefficient of a predetermined number of taps and simulates the impulse response of the echo path in each of the N subbands;

(c) subtracting the N echo replicas from the N subband echoes corresponding thereto to generate echo cancellation error signals in the N subbands;

(d) iteratively adjusting the filter coefficients of the digital filters by the projection or ES projection algorithm in a manner to minimize the N echo cancellation error signals on the basis of the N echo cancellation error signals and the N subband received signals corresponding thereto; and (e) combining the echo cancellation error signals in the N subbands into a send signal of the full band with the echo suppressed.

BRIEF DESCRIPTION OF THE DRAWINGS

FIG. 1 is a block diagram showing an example of the functional configuration of a conventional echo canceler;

DESCRIPTION OF THE PREFERRED EMBODIMENTS

Figure 2A:
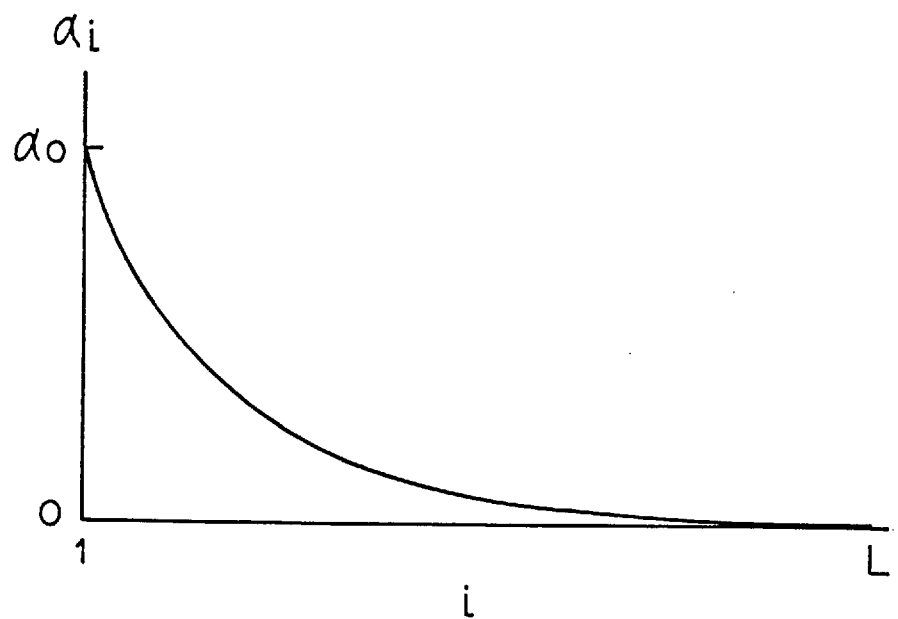
FIG. 2A is a graph showing an example of the diagonal component $\alpha_i$ of a step size matrix A.
Figure 2B:
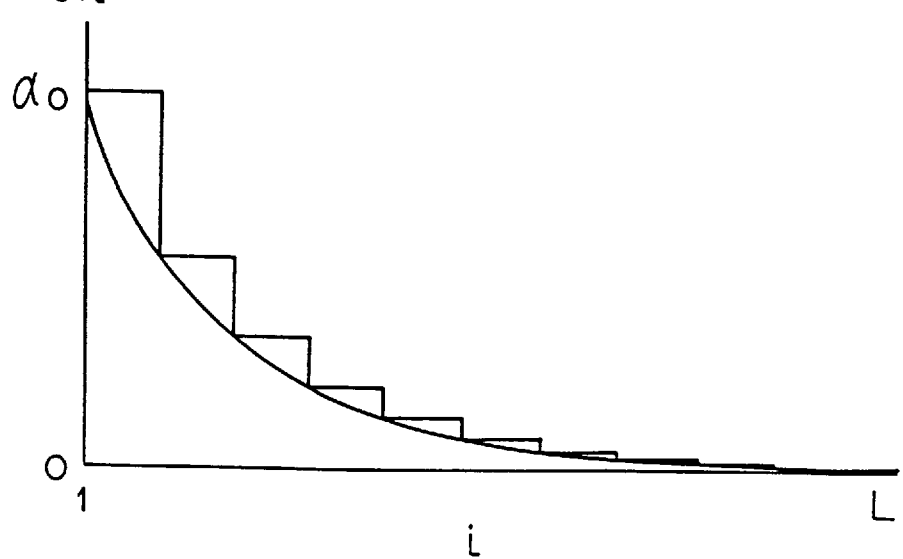
FIG. 2B is a graph showing an example of a stepwise approximation of the diagonal component $\alpha_i$ of the step size matrix A.
Figure 3:
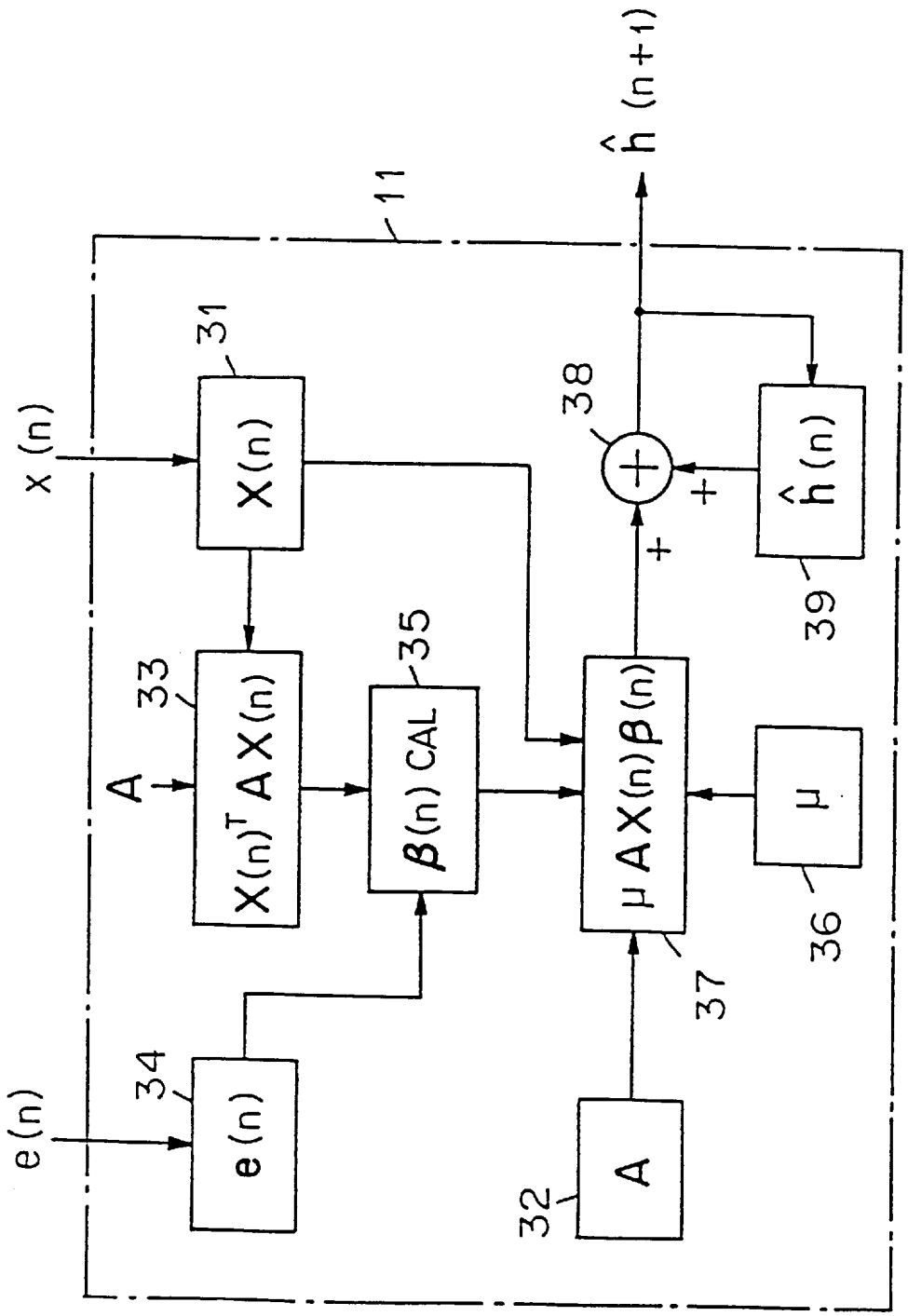
FIG. 3 is a block diagram showing an example of the functional configuration of an estimation part 11 in FIG. 1.
Figure 4:
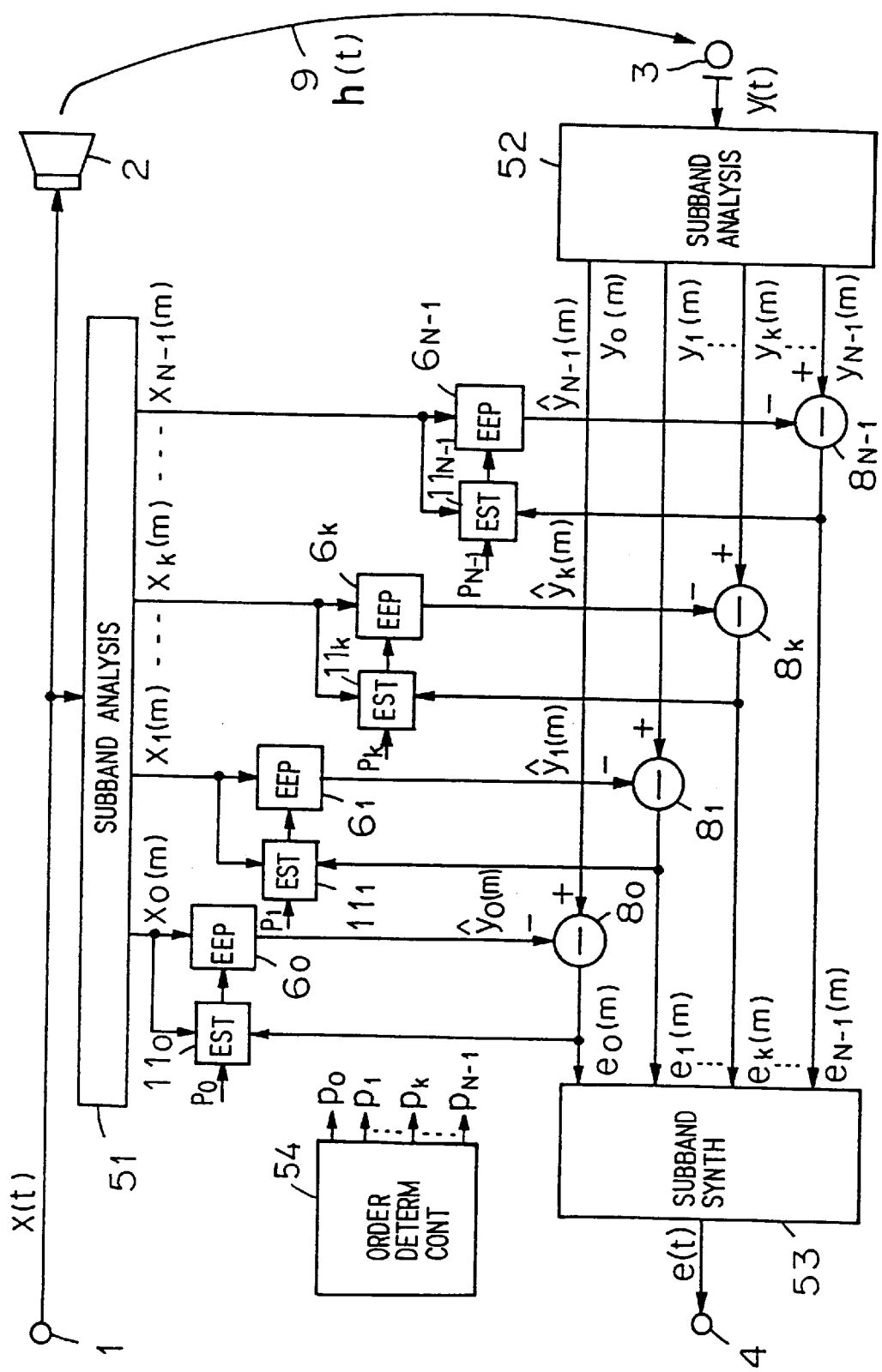
FIG. 4 is a block diagram illustrating an example of the functional configuration of an embodiment of the present invention.

In FIG. 4 there is illustrated in block form an example of the functional configuration of an echo canceler embodying the echo cancellation method of the present invention, the parts corresponding to those in FIG. 1 being identified by the same reference numerals. The received signal x(t) is reproduced by the loudspeaker 2 into speech and, at the same time, the received signal is fed to a subband analysis part 51, wherein it is converted to a digital signal and divided into N real-number signals $X_k(m)$ (where k=0,1, ..., N-1). On the other hand, the reproduced speech from the loudspeaker 2 propagates over the echo path 9 and is picked up as the echo y(t) by the microphone 3. The echo y(t) is fed to a subband analysis part 52, wherein it is converted to a digital signal, which is divided with the same dividing characteristic as that of the subband analysis part 51 into N real-number signals $y_k(m)$ of the respective subbands.

In each of the subbands divided by the subband analysis part 51 there is provided an estimated echo path $6_k$, which generates an echo replica $\hat{y}_k(m)$ and subtracts it by a subtractor $8_k$ from the corresponding subband echo $y_k(m)$ to cancel the echo. The estimated echo path $6_k$ needs to follow temporal variations of the echo path 9; in this instance, the filter coefficient of an FIR filter, which forms each estimated echo path $6_k$, is iteratively estimated by an estimation part $11_k$ using the projection or ES projection algorithm so that the residual $e_k(m)=y_k(m)-\hat{y}_k(m)$ approaches zero. By this, the estimated echo path $6_k$ is adjusted, ensuring an optimum echo cancellation at all times. The error signals (residual signals) $e_k(m)$ in the respective subbands are combined by a subband synthesis part 53 into an error signal e(t) of the full band, which is provided to the send out terminal 4.

Figure 5:
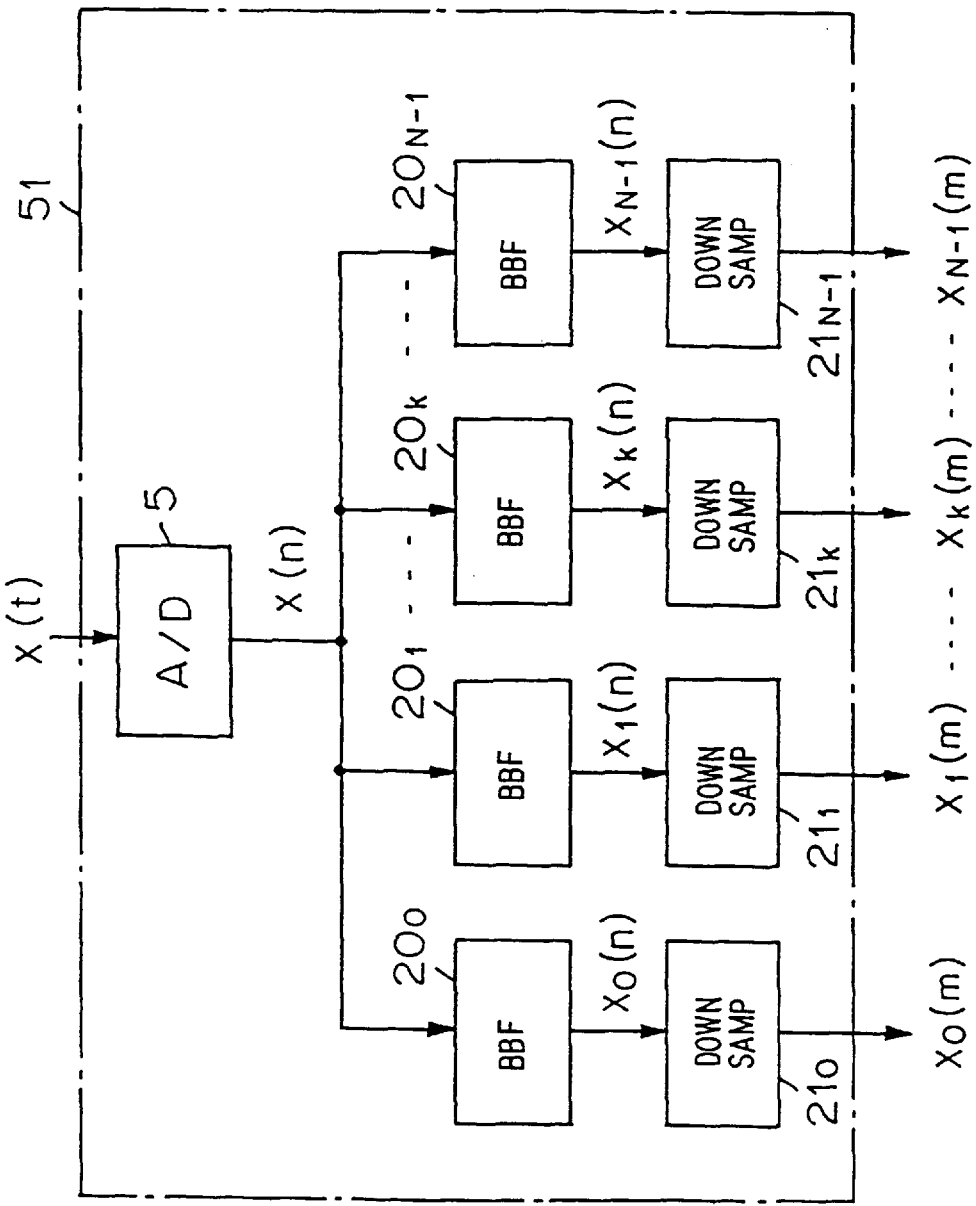
FIG. 5 is a block diagram illustrating the functional configuration of a subband analysis part 51 in FIG. 4.

FIG. 5 illustrates in block form the functional configuration of the subband analysis part 51, wherein the received signal x(t) is converted by the A/D converter 5 into samples, which are each band-limited by a band-pass filter $20_k$. Such a band-limited real-number signal $x_k(n)$ could be produced also by replacing the band-pass filter $20_k$ with an SSB (Single Side Band) scheme described in Crochiere and Rabiner, "Multirate Digital Signal Processing", Englewood Cliffs, N.J. :Prentice-Hall, pp. 52–56, 1983. The band-limited real-number signal $x_k(n)$ is down sampled with a down sampling ratio M to obtain a real-number signal $x_k(m)$. The signal $x_k(m)$ in each divided subband will hereinafter be referred to as a subband received signal. The subband analysis part 52 for the echo y(t) is identical in construction with the subband analysis part 51 of FIG. 5, and the echo $y_k(m)$ divided by the subband analysis part 52 into each subband will hereinafter be referred to as subband echo.

Figure 6:
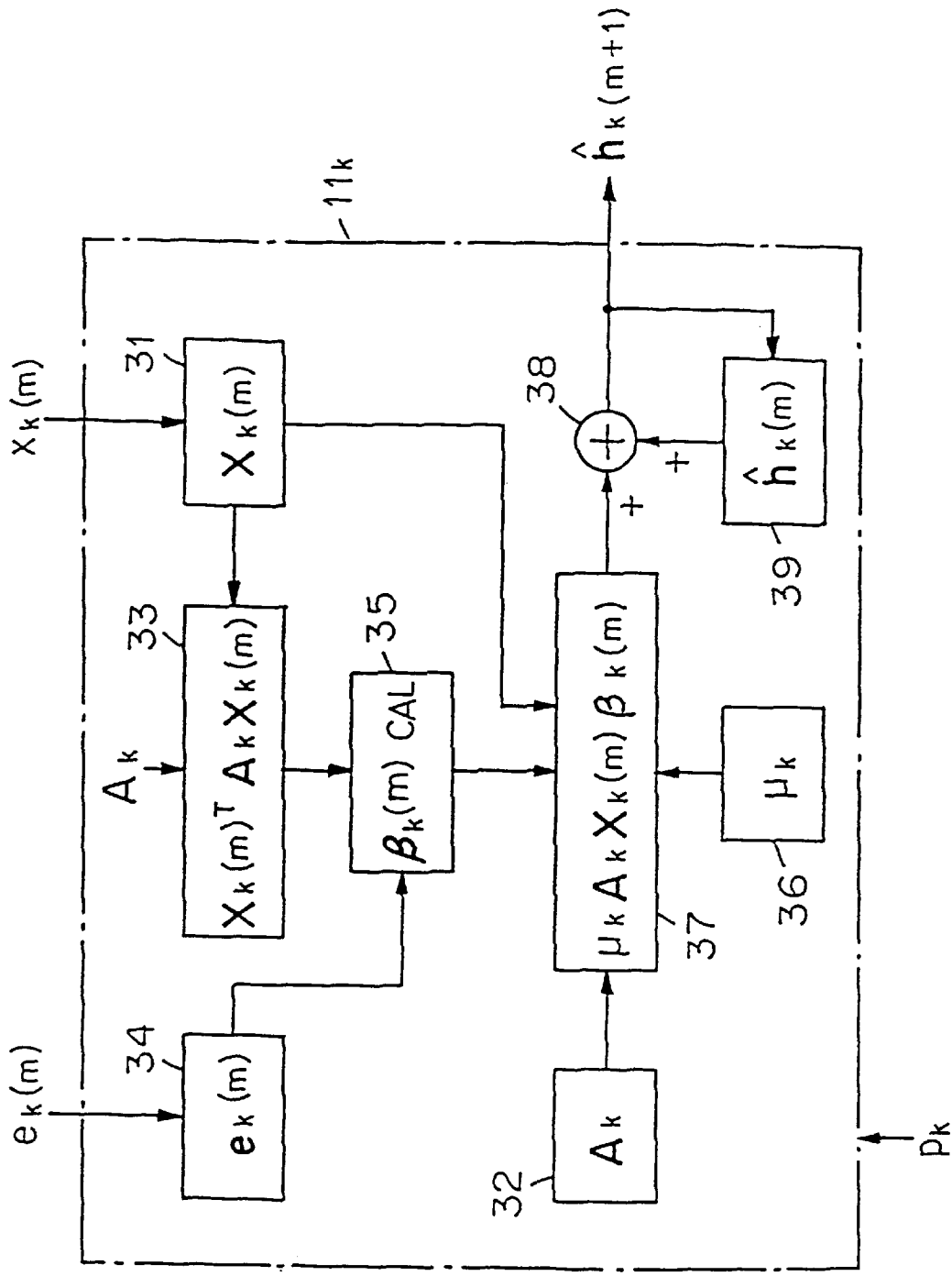
FIG. 6 is a block diagram illustrating an example of the functional configuration of a k-th subband estimation part $11^k$ in FIG. 4.

FIG. 6 illustrates in block form an example of the functional configuration of a k-th subband estimation part $11_k$ assumed to use a $p_k$-order ES projection algorithm (the projection algorithm when A=I). This estimation part $11_k$ is one of differences between the present invention using the ES projection algorithm and the invention of the aforementioned Makino et al. U.S. Pat. No. 5,272,695 using the ES algorithm.

Upon each application thereto of the subband received signal $x_k(m)$, the received signal storage part 31 generates $P_k$ subband signal vectors each consisting of successive $L_k$ subband received signals as follows:

$x_k(m)=[x_k(m), x_k(m-1), \ldots, x_k(m-L_k+1)]^T$
$x_k(m-1)=[x_k(m-1), x_k(m-2), \ldots, x_k(m-L_k)]^T$
$x_k(m-p_k+1)=[x_k(m-p_k+1), x_k(m-2), \ldots, x^k(m-p_k-L_k+2)]^T$ Further, the received signal storage part 31 creates from these vectors the following subband received signal matrix.

$X_k(m)=[x_k(m), x_k(m-1), \ldots, x_k(m-p_k+1)]$ where $L_k$ is the number of taps of the FIR filter forming the estimated echo path $6_k$ in the k-th subband. It is assumed, here that the $p_k$-order projection or ES projection algorithm is used in the k-th subband. In the step size matrix storage part 32 there is stored the first step size matrix $A_k$=diag[$\alpha_{k1}$, $\alpha_{k2}$, ..., $\alpha_{kLk}$]. The step size matrix $A_k$ is weighted using the impulse response variation characteristic in the corresponding subband.

In an ordinary room, the impulse response variation in the k-th subband is expressed as an exponential function using an attenuation ratio $\gamma_k$. The auto-correlation calculating part 33 calculates an auto-correlation matrix $X_k(m)^T A_k X_k(m)$ of the subband received signal matrix $X_k(m)$ weighted with the first step size matrix $A_k$. The thus calculated auto-correlation matrix and the residual $e_k(m)$ are fed to the $\beta_k(m)$ calculating part 35 to solve the following simultaneous linear equation with $P_k$ unknowns to obtain the constant $\beta_k(m)$:

$$[X_k(m)^T A_k X_k(m)]\beta_k(m)=e_k(m) \qquad (12)$$

To avoid instability in the inverse matrix operation, a small positive constant $\delta_k$ is used as follows:

$$[X_k(m)^T A_k X_k(m)+\delta_k I]\beta_k(m)=e_k(m) \qquad (12)'$$

where I represents a unit matrix. The second step size $\mu_k$ from the step size storage part 36, the first step size matrix $A_k$, the received signal matrix $X_k(m)$ and the constant $\beta_k(m)$ are provided to the adjusted vector calculating part 37 to calculate the following adjusted vector:

$$\mu_k A_k X_k(m)\beta_k(m) \qquad (13)$$

The adjusted vector is fed to the adder 38, wherein it is added to the coefficient vector $\hat{h}_k(m)$ consisting of $L_k$ elements from the tap coefficient storage part 39 to obtain the adjusted coefficient vector (impulse response) $\hat{h}_k(m+1)$. The calculated result $\hat{h}_k(m+1)$ is provided to the estimated echo path $6_k$ and, at the same time, it is fed to the tap coefficient storage part 39 to update the value stored therein.

By repeating the above-described operation upon each application of the subband received signal $x_k(m)$, the estimated echo path $6_k$ is iteratively updated following equation (14) and the impulse response $\hat{h}_{K(m)}$ of the estimated echo path $6_k$ approaches the impulse response $h_k(m)$ of the true echo path 9 in the k-th subband.

$$\hat{h}_k(m+1)=\hat{h}_k(m)+\mu_k A_k X_k(m)\beta_k(m) \qquad (14)$$

where $A_k$=diag[$\alpha_{k1}$, $\alpha_{k2}$, ..., $\alpha_{kLk}$]:
step size matrix in the k-th subband
$\alpha_{ki}=\alpha_{ko}\gamma_k^{i-1}$ (i=1, 2, ..., $L_K$)
$\gamma_k$: attenuation ratio of the impulse response variation in the k-th subband
$L_K$: number of taps in the k-th subband
$\hat{h}_k(m)=[\hat{h}_{k1}(m), \hat{h}_{k2}(m), \ldots, \hat{h}_{kLk}(m)]_T$
: estimated echo path (FIR filter) coefficient in the k-th subband
$e_k(m)=[e_k(m),(1-\mu_k)e_k(m-1), \ldots, (1-\mu_k)^{pk-1}e_k(m-p^k+1)]_T$ (15)
$e_k(m)=y_k(m)-\hat{h}_k(m)^T x_k(m)$
: estimation error in the k-th subband $$X_k(m)=[x_k(m), x_k(m-1), \ldots, x_k(m-p_k+1)]^T \qquad (16)$$

$$x_k(m)=[x_k(m), x_k(m-1), \ldots, x_k(m-L_k+1)]^T \qquad (17):$$

received signal vector in the k-th subband $$\beta_k(m)=[\beta_{k1}, \beta_{k2}, \ldots, \beta_{kpk}]^T \qquad (18)$$

$\mu_k$: second step size (scalar quantity) in the k-th subband

It must be noted here that the number of taps $L_k$ in each subband is reduced by down sampling. In the (ES) projection algorithm the relationship between the order p and the convergence characteristic is affected by the number of taps L. That is, when the number of taps L is large, the order p needs to be set large for complete whitening (flattening), whereas when the number of taps L is small, complete whitening can be achieved with a small order p. For example, when the number of taps L is about 1000, it is necessary to set the order p to 50-th order or so; in contrast to this, when the number of taps $L_k$ is reduced to around 64 by the subband analysis and the down sampling, about 16-th order is enough.

Figure 7:
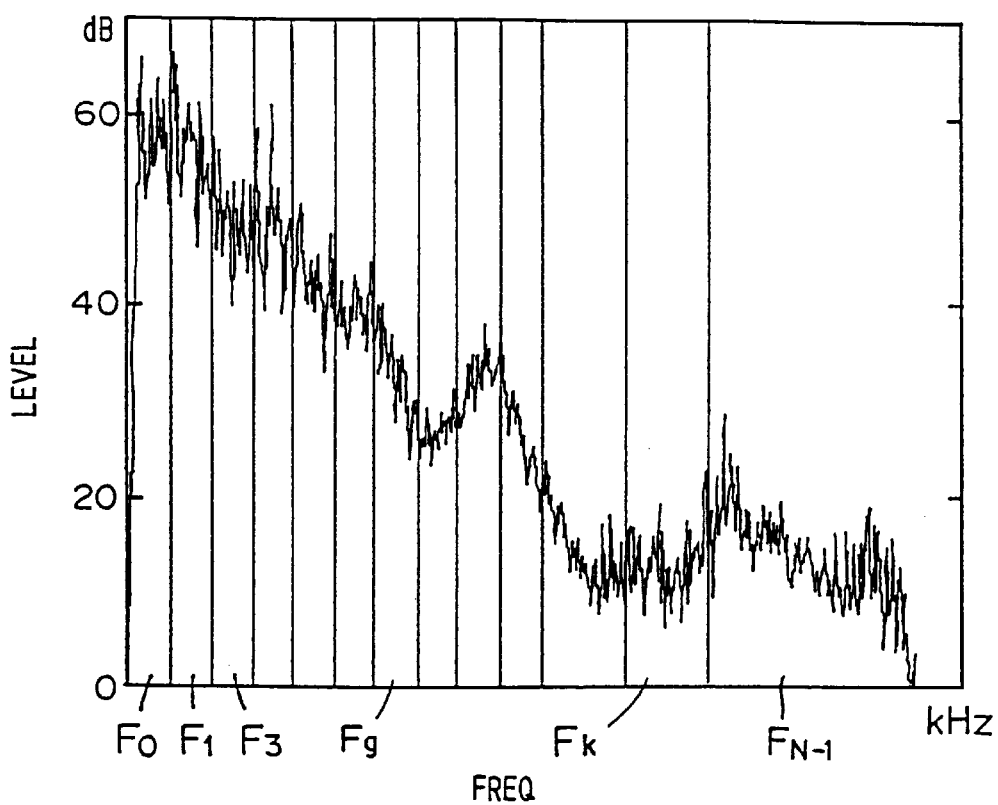
FIG. 7 is a graph showing an example of the frequency spectrum of a speech signal.

In the example of the frequency spectrum of speech shown in FIG. 7, when the received signal is divided into a plurality of subbands $F_0, F_1, \ldots, F_{N-1}$, the spectral envelope differs with the subbands. As a result, the order of the (ES) projection algorithm for whitening (flattening) the signal in each subband also differs. For instance, the subband $F_g$ in FIG. 7 calls for a high-order (ES) projection algorithm since the spectrum varies complicatedly, but in the subband $F_k$ the required order of the (ES) projection algorithm is low since the spectrum is appreciably flat.

Figure 8:
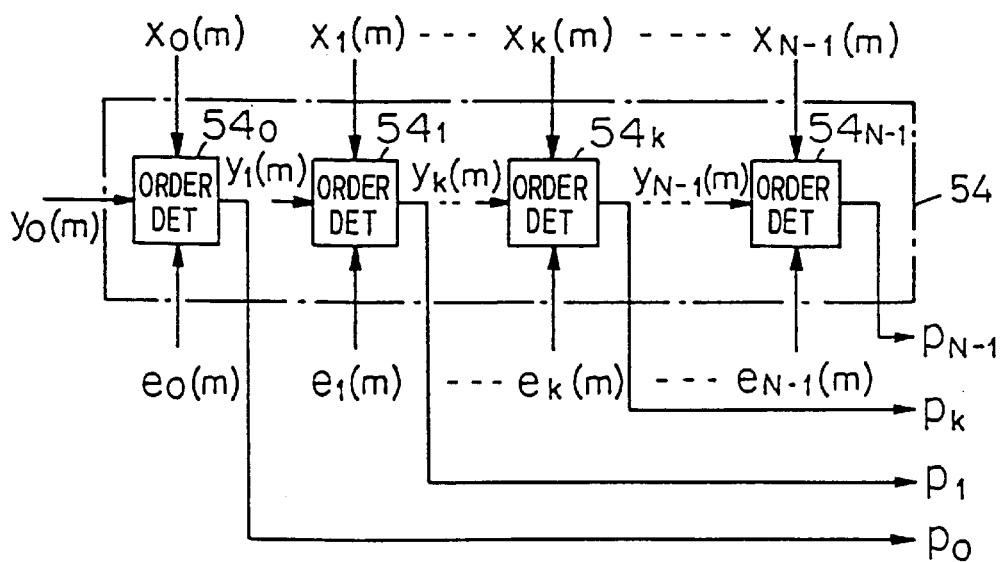
FIG. 8 is block diagram illustrating an example of the functional configuration of an order determination control part 54 for use in the application of a first or second order determining scheme in FIG. 4.

Hence, the present invention determines the order suited to each subband, that is, the lowest possible order that achieves the fastest possible convergence. To this end, an order determination control part 54 is provided as shown in FIG. 4. In FIG. 8 there is illustrated an example of its functional configuration. The order $p_k$ of the (ES) projection algorithm in each subband is determined by the order determination control part 54 as described below.

Figure 9:
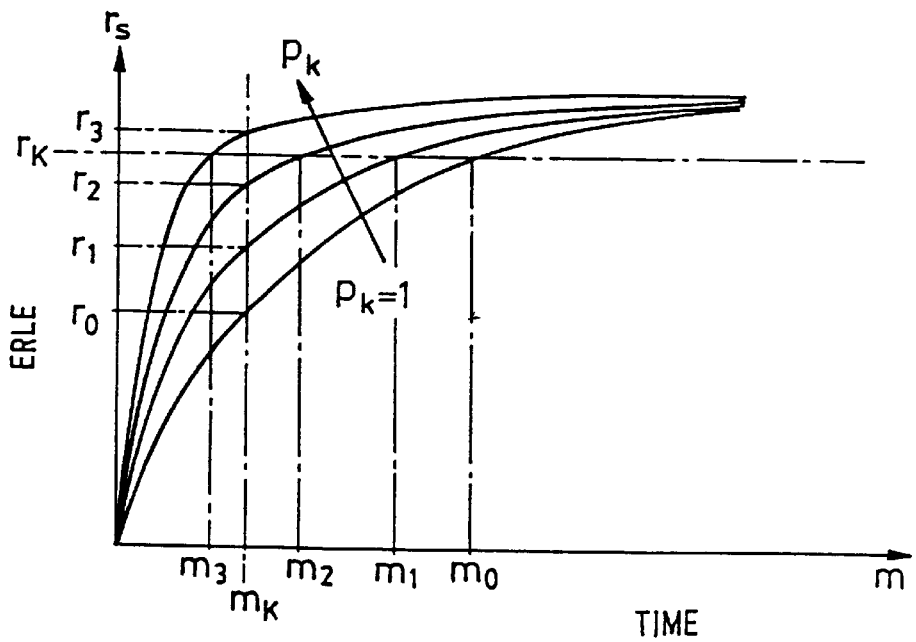
FIG. 9 is a graph schematically showing variations in the convergence speed of an echo return loss enhancement with an increase in the projection order.

Scheme 1: Observe how convergence proceeds from the subband echo $y_k$ and the residual signal $e_k$ while changing the order $p_k$. The order determination control part 54 in this case is made up of order determining parts $54_0$ to $54_{N-1}$ each provided in one of the subbands as shown in FIG. 8. By setting the order $p_k=1$, for example, in each subband and calculating the ratio (echo return loss enhancement:ERLE) $r_{pk}=20\log_{10}(y_k/e_k)$ between the subband echo $y_k$ and the residual signal $e_k$ that is obtained upon each input of the subband received signal $x_k(m)$, a convergence curve of the echo return loss enhancement ERLE such as schematically shown in FIG. 9 is obtained. Similar ERLE convergence curves are obtained also when the order $p_k$ becomes higher. Thus, the scheme 1 starts the echo cancellation by the $p_k$-th order projection algorithm at time m=0, and the order determining part $54_k$ calculates the ERLE value $r_s$ at a predetermined time $m=m_k$ for every one of a series of orders $p_k=p_s$, where s=1,2, . . . , which monotonously increase so that, for example, $p_{s+1}=p_s+1$, where $p_1=1$. Then, upon each calculation of the ERLE value $r_s$ for every order $p_k=p_s$, the order determining part $54_k$ calculates the ratio, $R=(r_s-r_{s-1})/(p_s-p_{s-1})$, of the difference between the current ERLE value $r_s$, and that $r_{s-1}$ in the echo cancellation by the projection algorithm of the current and immediately preceding orders $p_k=p_s$ and $p_k=p_{s-1}$ to the difference $(p_s-p_{s-1})$ between the current and the immediately preceding orders. Then the order determining part $54_k$ determines the order $p_k=p_s$ in which the calculated value begins to be smaller than a predetermined threshold value $R_{th}$.

Figure 10:
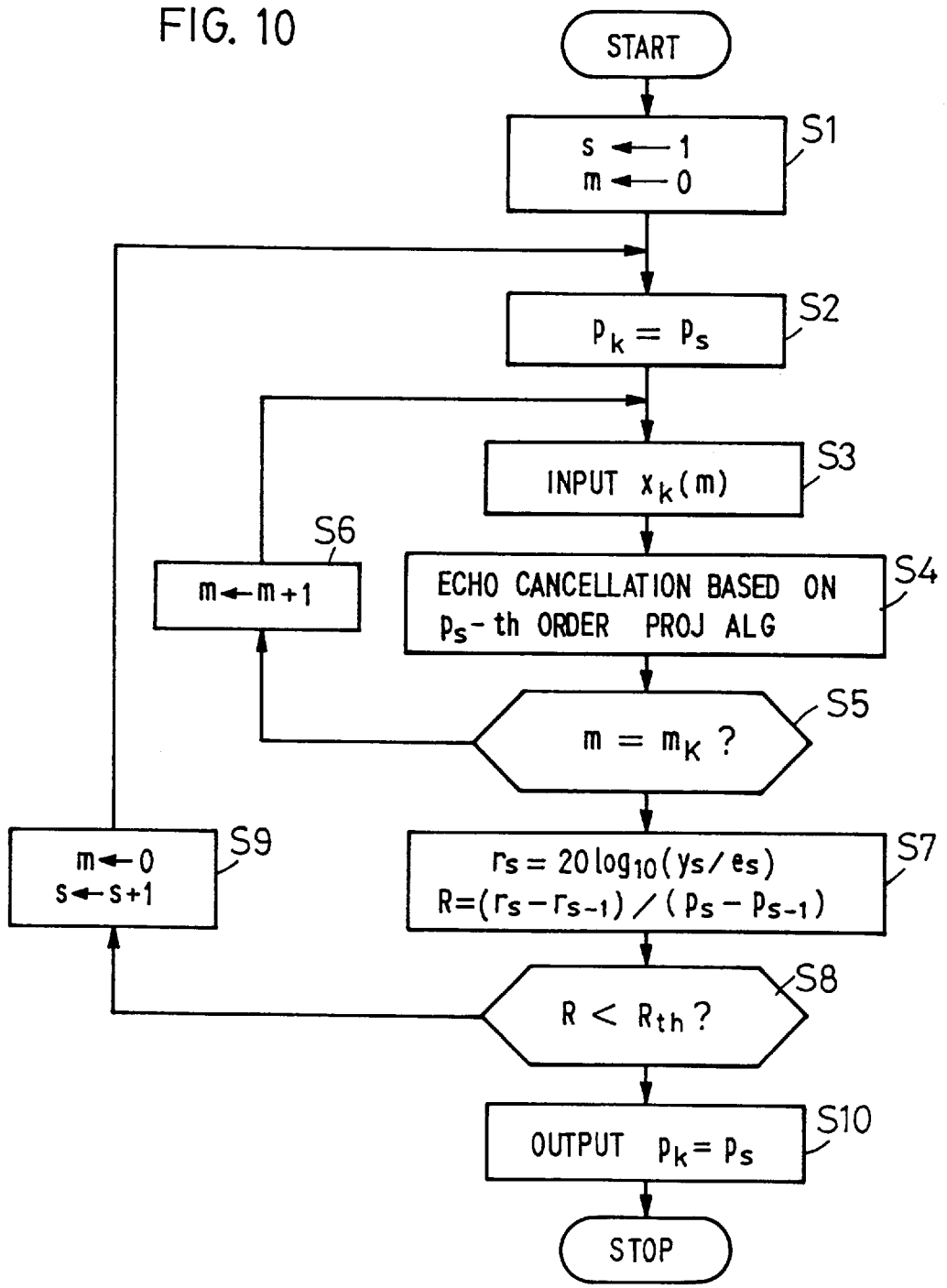
FIG. 10 is a flowchart showing the order determining procedure by a first order determining scheme.

FIG. 10 shows a concrete example of the order determining procedure by the first order determining scheme. The order determining part $54_k$ initially sets integral parameters s and m to 1 and 0, respectively, in step S1 and, in step S2, sets the order $p_k=p_s$ and provides it to the estimation part $11_k$ in the corresponding subband. When the subband received signal $x_k(m)$ is input in step S3, the procedure proceeds to step S4, wherein the received signal vector $x_k(m)$ is provided to the estimated echo path $6_k$ to obtain therefrom the echo replica $\hat{y}_k(m)=\hat{h}_k(m)^T x_k(m)$ and the estimation error $e_k(m)=y_k(m)-\hat{y}_k(m)$ between the echo replica $\hat{y}_k(m)$ and the subband echo $y_k(m)$ is calculated by the subtractor $8_k$. Further, the estimation part $11_k$ estimates the coefficient $\hat{h}_K(m+1)$ of the estimated echo path $6_k$ by the $(p_k=p_s)$-th projection algorithm, using $p_k+L_k$ subband received signals $x_k(m)$, $x_k(m-1), \ldots, x_k(m-p_k-L_k+2)$ and $p_k$ estimation errors $e_k(m), e_k(m-1), \ldots, e_k(m-p_k+1)$ which start at the latest time m. The thus estimated coefficient $\hat{h}_k(m-1)$ is set in the corresponding estimated echo path $6_k$. That is, upon each input of the subband received signal $x_k(m)$, the echo cancellation based on the $(p_k=p_s)$-th order projection algorithm is carried out, in step S4, by the parts associated with the k-th subband in the echo canceler shown in FIG. 4.

In step S5 a check is made to see if the time m has reached a predetermined time $m_k$; if not, the value m is incremented by one in step S6 and the procedure goes back to step S3, and the echo cancellation is carried out by the $p_k$-th order projection algorithm in steps S3 and S4. The echo cancellation is repeated until the time m reaches $m_k$, and at the time $m=m_k$, the procedure proceeds to step S7, wherein the order determining part $54_k$ calculates the ERLE value $r_s=20\log_{10}(y_s/e_s)$ from the subband echo $y_s=y_k(m_k)$ and the estimation error $e_s=e_k(m_k)$ at that point in time $m=m_k$ and calculates the rate, $R=(r_s-r_{s-1})/(p_s-p_{s-1})$, of an increase in the ERLE value to an increase in the order $(p_s-p_{s-1})$, that is, the degree of saturation of the whitening. In this case, when s=1, R=∞. Then, in step S8 a check is made to see if the degree of saturation of the whitening R is smaller than the predetermined value $R_{th}$; if not (the whitening has not saturated), the parameter m is reset to zero and the parameter s is incremented by one in step S9, after which the above-described processing of steps S3 to S8 is carried out again by the $(p_k=p_s)$-th projection algorithm. When $R<R_{th}$ is satisfied in step S8, it is decided that the whitening has been fully saturated, and in step S10 the order $p_s$ at that time is determined to be the order $p_k$ of the projection algorithm in the k-th subband, which is output to the corresponding estimation part $11_k$.

Figure 11:
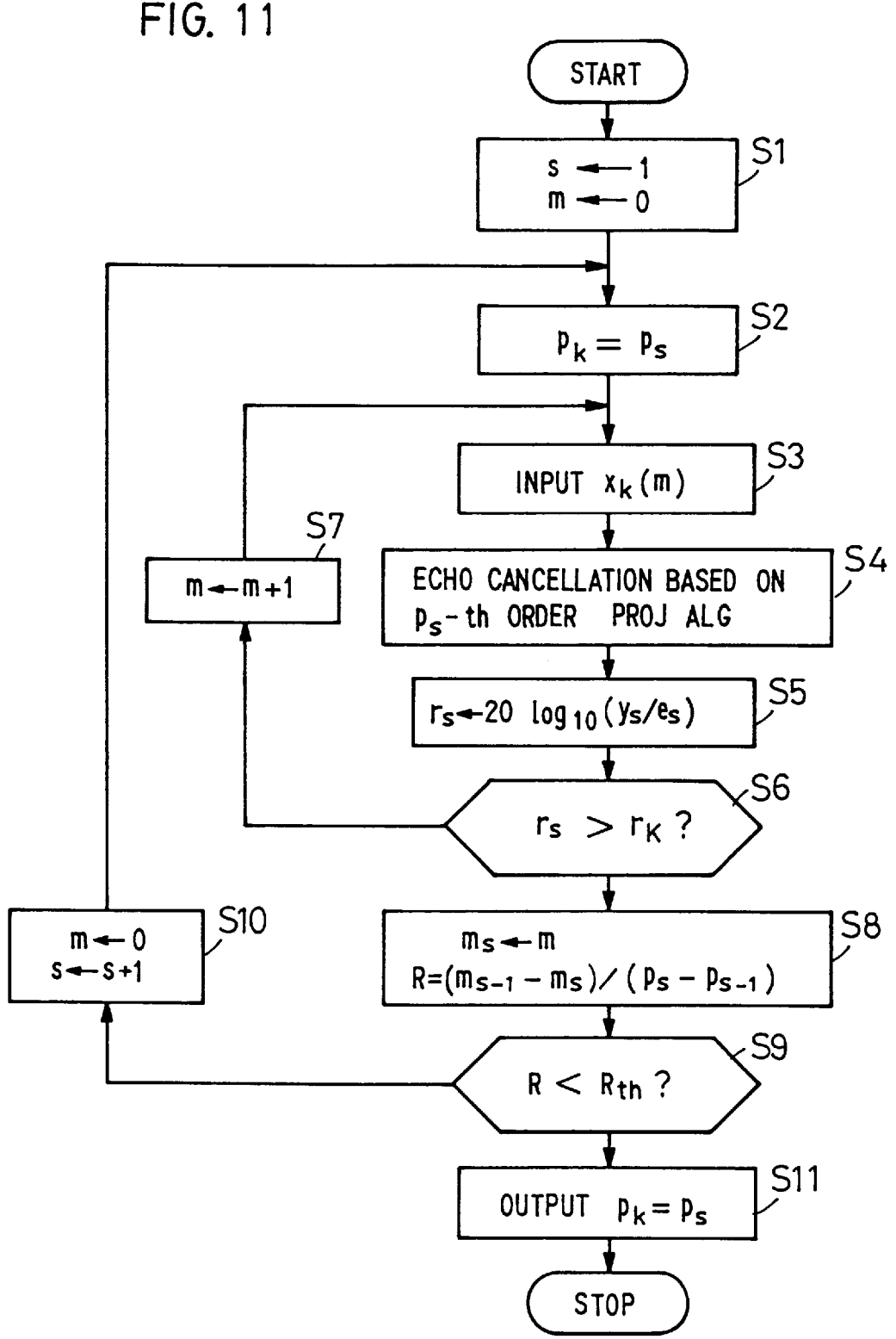
FIG. 11 is a flowchart showing the order determining procedure by a second order determining scheme.

Scheme 2: A threshold value $r_k$ of a predetermined ratio, for example, 30 dB, is determined with respect to the ERLR saturation value through utilization of the fact that the time for reaching the fixed ERLE value $r_k$ decreases as the order $p_k$ becomes higher in FIG. 9. For each of the monotonously increasing orders $p_k=p_s$, where s=1, 2, . . . , the echo cancellation by the $(p_k=p_s)$-th order projection algorithm is started at the time m=0, and upon each input of the subband signal $x_k(m)$, the calculation of the ERLE value $r_s=20\log_{10}(y_s/e_s)$ is repeated in the order determining part $54_k$ in FIG. 8, by which is detected the time $m_s$ when the ERLE value $r_s$ becomes smaller than the threshold value $r_k$. This is followed by determining the order $p_k=p_s$ in which the ratio, $R=(m_{s-1}-m_s)/(p_s-p_{s-1})$, of the difference between points in time $m_{s-1}$ and $m_s$, at which $r_s>r_k$, detected in the echo cancellation by the projection algorithms of the immediately preceding and current order $p_{s-1}$ and $p_k=p_s$, respectively, to the difference between the preceding and current orders, $(p_s-p_{s-1})$, becomes smaller than the predetermined threshold value $R_{th}$. FIG. 11 shows the order determining procedure in this instance.

As is the case with FIG. 10, in step S1 the integral parameters s and m are initially set to 1 and 0, respectively, then in step S2 the order $p_k$ is to $p_s$, and upon each input of the subband received signal $x_k(m)$ in step S3, the echo cancellation by the $p_s$-th order algorithm is carried out in step S4. With the second scheme, in step S5 the order determining part $54_k$ calculates ERLE value $r_s=20\log_{10}(y_s/e_s)$ from the subband echo $y_s=y_k(m)$ and the estimation error $e_s=e_k(m)$ and in step S6 a check is made to determine if the ERLE value $r_s$ is larger than the predetermined value $r_k$; if not, the parameter m is incremented by one, then the procedure returns to step S3, and steps S4, S5 and S6 are repeated again. When $r_s>r_k$, it is decided in step S8 that the current time m is the time $m_s$ when the ERLE value $r_s$ has reached the predetermined value $r_k$ in the echo cancellation by the projection algorithm of the order $p_k=p_s$. Then the ratio of the time difference $(m_{s-1}m_s)$ between the current time ms and the time $m_{s-1}$, at which the value $r_k$ has been reached in the case of the order $p_k=p_{s-1}$, to the difference $(p_s-p_{s-1})$ between the current and the immediately preceding order of the projection algorithm for echo cancellation, that is, the degree of saturation of the whitening, is calculated as $R=(m_{s-1}-m_s)/(p_s-p_{s-1})$. In this instance, when s=1, $R=\infty$. This is followed by step S9, wherein a check is made to determine if the above-mentioned value R has become smaller than the predetermined threshold value $R_{th}$; if not the parameter m is reset to zero and the parameter is incremented by one in step S10, then the procedure returns to step S2, followed by repeating the steps S2 to S9. When it is decided in step S9 that $R<R_{th}$, it is determined in step S11 that the order $p_k=p_s$ at that time is the order $p_k$ of the projection algorithm in the k-th subband, and the thus determined order is set in the corresponding estimation part $11_k$.

In either case, the monotone increasing order $p_k=p_s$ (where $s=1,2,\ldots$) of the projection algorithm in the k-th subband may be set to, for instance, $p_{s+1}=p_s+d$ (where d is a fixed integer equal to or greater than 1), or $p_{s+1}=p_s+sd$, or $p_{s+1}=cp_s$ (where c is a fixed integer equal to or greater than 2). It is also possible to use any monotone increasing functions as long as they are gradually increasing functions.

Figure 12:
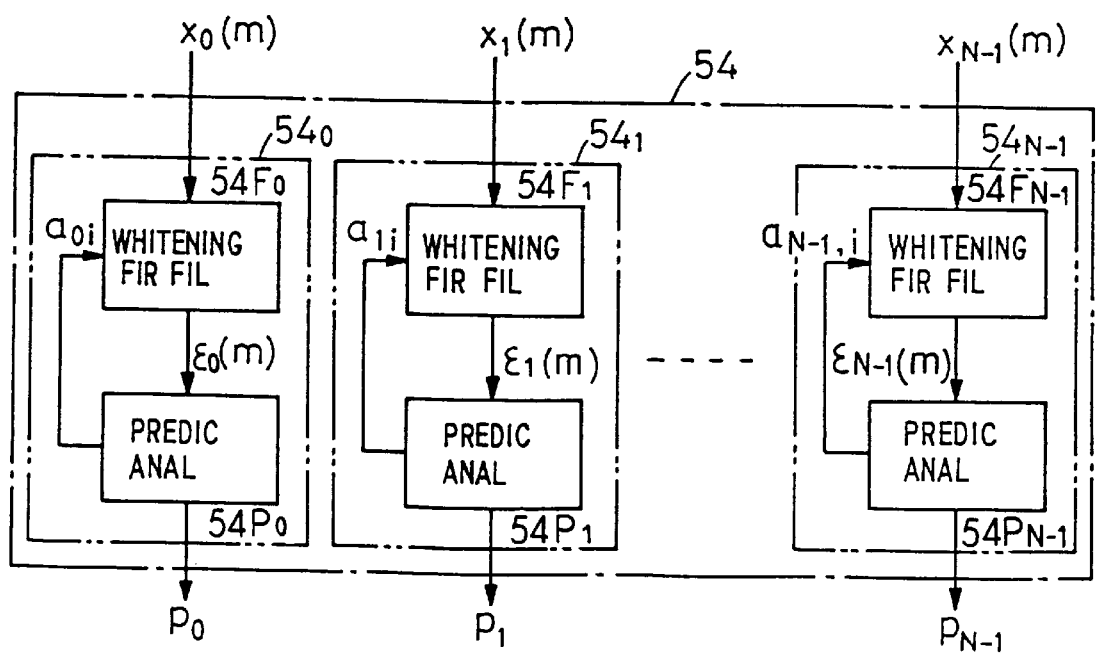
FIG. 12 is a block diagram illustrating an example of the configuration of an order determination control part 64 for use in the application of a third order determining scheme.

Scheme 3: The pk-th order (ES) projection algorithm is equivalent to the application of the input signal $X_k$ to a $(p_k-1)$-th whitening FIR filter (that is, a linear predictive coding filter with $p_k$ taps). Then, each order determining part $54_k$ (k=0,1,..., N-1) of the order determination control part 54 is formed by a $(p_k-1)$-th whitening FIR filter $54F_k$ and a prediction analysis part $54P_k$ as shown in FIG. 12. For a series of $L_k$ subband received signals $X_k(m-j)$ that are input into the whitening FIR filter $54F_k$ for each subband, the prediction analysis part $54P_k$ calculates prediction coefficients $a_{ki}$ (where $i=1,2,\ldots,p_k-1$) that minimize the squared sum of $L_k$ prediction errors $\epsilon_k(m-j)$ (where $j=0,1,\ldots,L_k-1$), given by the following equation (19).

$$\sum_{j=0}^{L_k-1} \epsilon_k^2(m-j) = \sum_{j=0}^{L_k-1} \left\{ x_k(m-j) - \sum_{i=1}^{pk-1} a_{ki}x_k(m-j-i) \right\}^2 \quad (19)$$

(This is commonly called a linear prediction analysis, which is well-known in the art.) Letting the $L_k$ prediction errors $\epsilon_k(m-j)$ (where $j=0,1,\ldots,L_{k-1}$), which are obtained by setting the prediction coefficients $a_{ki}$ in the filter $54F_k$, be represented as vectors $$\epsilon_k(m)=[\epsilon_k(m), \epsilon_k(m-1),\ldots,\epsilon_k(m-L_k+1)]^T \quad (20)$$

the prediction error vectors $\epsilon_k(m)$ can be expressed as follows:

$$\epsilon_k(m)=X_k(m)a_k(m) \quad (21)$$

where $$a_k(m)=[1, -a_{k1}, -a_{k2},\ldots, -a_{kpk-1}]^T \quad (22)$$

Eq. (21) represents the whitening of the subband received signal matrix $X_k(m)$, and the following covariance matrix of the prediction error vectors $\epsilon_k(m)$ obtained by this whitening has $L_k$ eigen values $\lambda_{k0}, \lambda_{k1},\ldots,\lambda_{kLk-1}$.

$$Q_k(m)=\epsilon_k(m)\epsilon_k(m)^T \quad (23)$$

The ratio $C_s$ between the maximum and minimum ones, $\lambda_{max}$ and $\lambda_{min}$, of these eigen values represents the degree of whitening of the subband signal matrix $X_k(m)$. The smaller the value of this ratio $S_c$, the higher the degree of whitening. When complete whitening is achieved, the ratio $C_s=1$. Then, the ratio $C_s$ (where $s=1,2,\ldots$) is calculated when the projection order $p_k=p_s$ (where $s=1,2,\ldots$) is raised to higher value one after another, and the first order $p_s$ at the time when the ratio $C_s$ becomes smaller than a predetermined threshold value $C_{th}$ or when the ratio variation $\Delta C_s=C_{s-1}$ becomes smaller than a predetermined threshold value $\Delta C_{th}$ is determined to be the order $p_k$ of the projection in the k-th subband.

Figure 13:
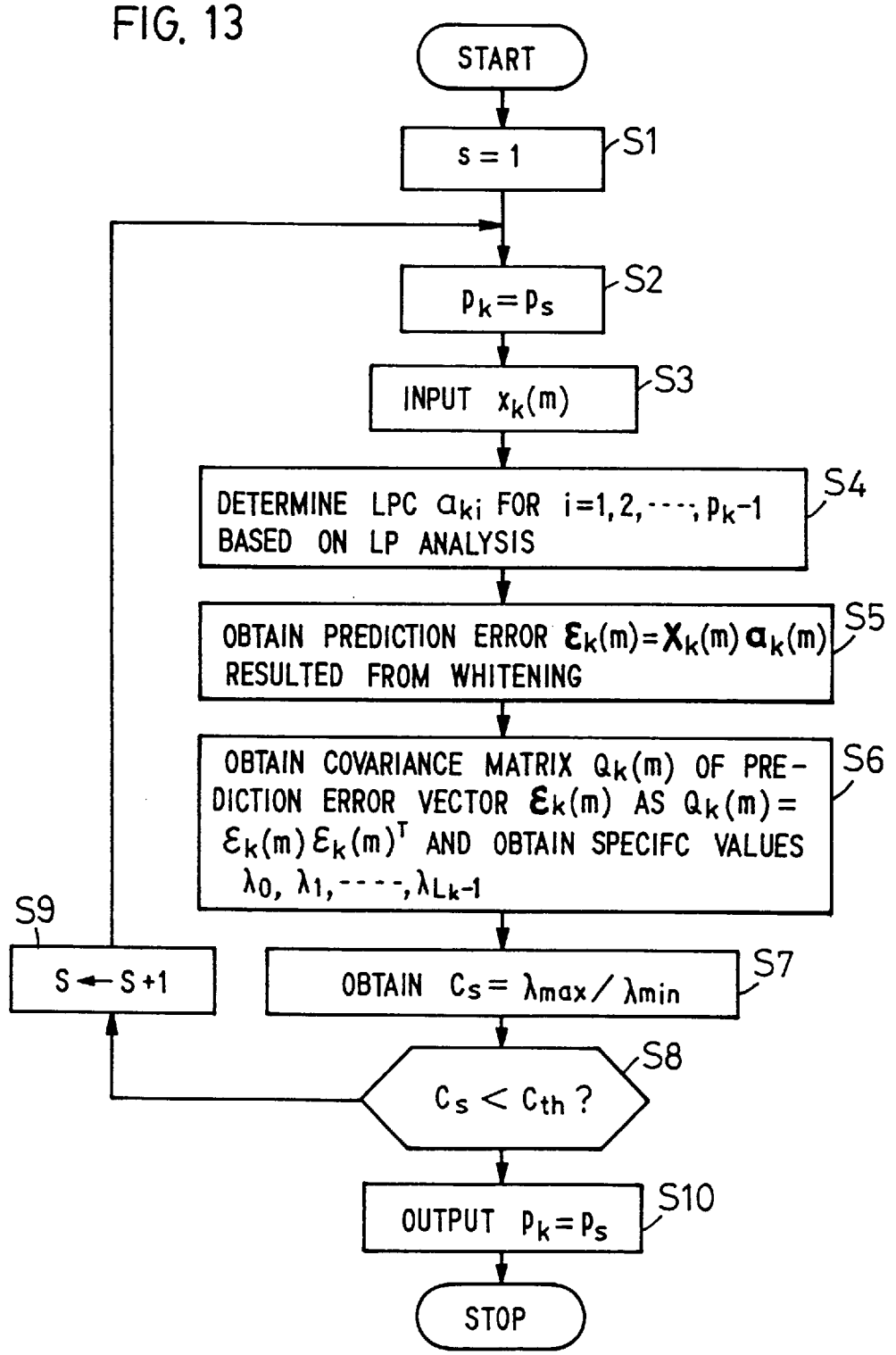
FIG. 13 is a flowchart showing the order determining procedure by the third order determining scheme.

FIG. 13 illustrates the procedure for determining the order $p_k$ of the projection algorithm in the k-th subband through the use of the third scheme. In step S1 the integral parameter s is set to 1, then in step S2 the order $p_k$ is set to $p_s$, and in step S3 the required number of subband received signals $x_k(m), x_k(m-1),\ldots,x_k(m-p_k-L_k+2)$ for the constitution of the received signal matrix $X_k(m)$ is input. Next, in step S4 the input subband received signals are subjected to the linear prediction coding (LPC) analysis by Eq. (19) to calculate the predictive coefficients $a_{ki}$ (where $i=1,2,\ldots,p_{k-1}$), and in step S5 the subband received signals are whitened by Eq. (21) to calculate the estimation error vectors $\epsilon_k(m)$. Then, in step S6 the covariance matrix $Q_k(m)$ of the estimation error vectors $\epsilon_k(m)$ expressed by Eq. (23) is calculated and the $L_k$ eigen values $\lambda_0, \lambda_1,\ldots,\lambda_{Lk-1}$ of the covariance matrix $Q_k(m)$ are calculated. In step S7 the ratio $C_s=\lambda_{max}/\lambda_{min}$ between the maximum and minimum values of the eigen values is calculated and in step S8 a check is made to see if the ratio $C_s$ is smaller than the threshold value $C_{th}$. If not, the parameter s is incremented by one in step S9, after which steps S2 to S8 are repeated again. When it is determined in step S8 that the ratio $C_s$ is smaller than the threshold value $C_{th}$, it is determined in step S10 that the order $p_s$ is the order $p_k$ of the projection algorithm in the k-th subband, and the order $p_s=p_k$ is output.

While in the above the ratio $C_s$ has been described to be compared with the threshold value $C_{th}$ in step S8, it is also possible to employ a procedure wherein the difference, $\Delta C_s=C_{s-1}-C_s$, between the ratios $C_{s-1}$ and $C_s$ obtained with the immediately preceding and current orders $p_{s-1}$ and $p_s$, respectively, is calculated in step S7, then the difference $\Delta C_s$ is compared with the predetermined threshold value $\Delta C_{th}$ in step S8 and, when the difference $\Delta S_c$ becomes smaller than the threshold value $\Delta C_{th}$, the order $p_k=p_s$ at that time is output in step S10. As the function for monotonously increasing the order $p_k=p_s$, the same monotone increasing functions as those described previously with respect to the first and second order determining schemes can be used.

It is possible to determine the orders $p_k$ of the projection algorithm for various speech sounds by any one of the order determining schemes 1 to 3 and preset the order$_s$ in the estimation part $11_k$, for example, prior to shipment from factory. Incidentally, it is also possible to determine the orders $p_k$ of the projection algorithm with respect to various speech sounds, various numbers N of subbands and the number of taps $L_k$ by any one of the schemes 1 to 3 and prestore a standard value of the order $p_k$ in a ROM so that a user sets the order $p_k$ in the estimation part 11k from the ROM in correspondence with a desired number N of subbands of the echo canceler.

When using the DSP to construct the echo canceler, the order of the (ES) projection algorithm cannot be raised up to the level of complete whitening in many instances because of real-time constraints. In such a case, the order $p_k$ in each subband is determined so that the echo canceler attains the highest level of performance as a whole within a given operation time.

As described above, by setting the order of the (ES) projection algorithm in each subband to the most desired value for the echo canceler, the whitening effect by raising the order of the (ES) projection algorithm can sufficiently be produced; therefore, an echo canceler of fast convergence can be configured.

Figure 14:
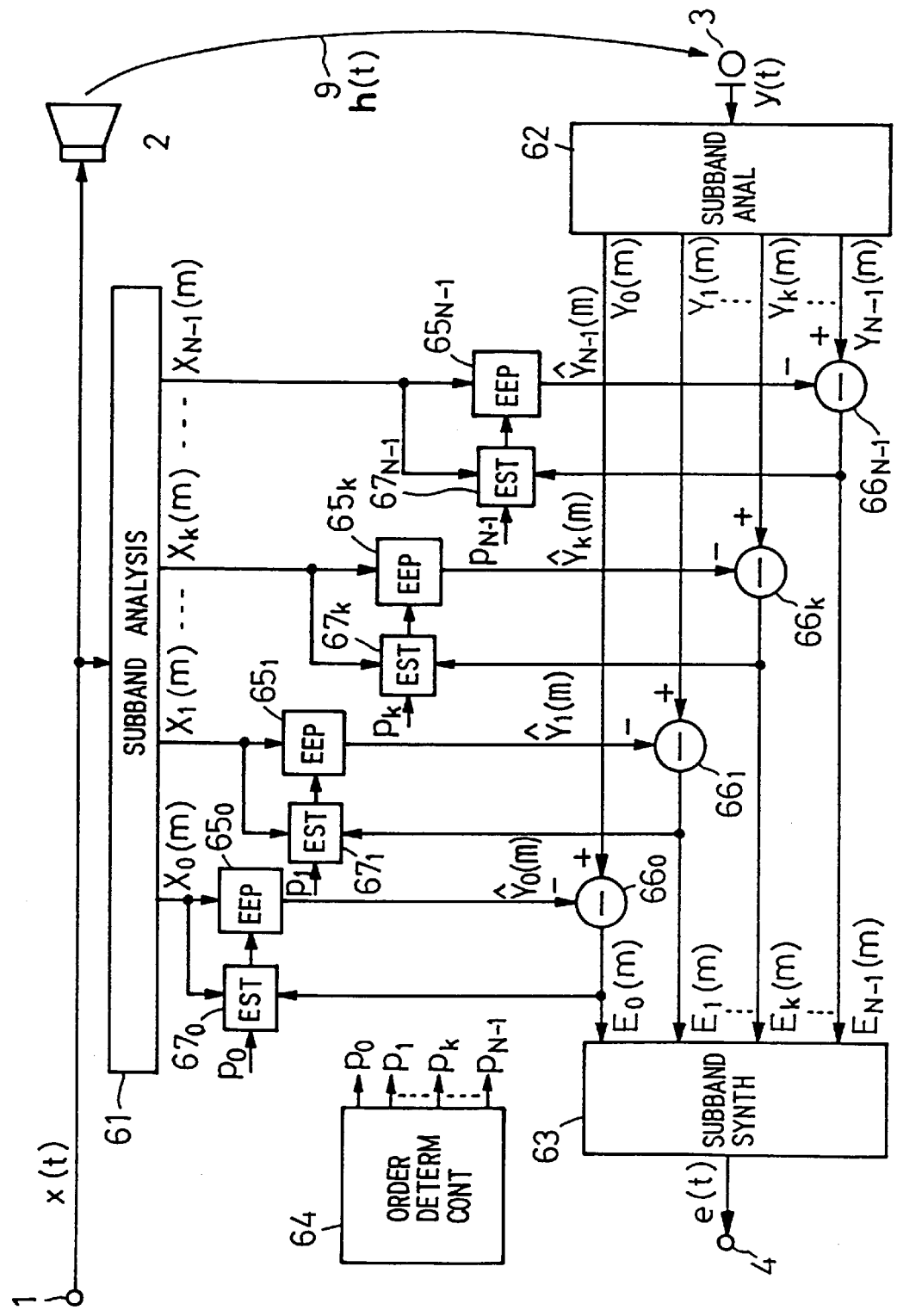
FIG. 14 is a block diagram illustrating an example of the functional configuration of another embodiment of the present invention.

FIG. 14 illustrates another embodiment of the present invention, which differs from the FIG. 4 embodiment in the subband analysis scheme and in that the signals $X_k(m)$, $Y_k(m)$ and $E_k(m)$ and the estimated echo path (FIR filter) coefficient $\hat{H}_k(m)$ are complexes. An echo canceler using the same subband analysis scheme is described in the aforementioned literature by S. Gay and R. Mammone. The received signal x(t) is divided by a subband analysis part 61 into N subband complex signals $X_k(m)$ (where k=0,1, ... , N−1). Similarly, the echo y(t) is divided by a subband analysis part 62 into N subband complex signals $Y_k(m)$. In each subband there is provided an estimated echo path $65_k$, and an echo replica $\hat{Y}_m(k)$ from the estimated echo path $65_k$ is subtracted by a subtractor $66_k$ from the subband echo $y_k(m)$ to cancel it.

The estimated echo path (a complex FIR filter) $65_k$ needs to follow temporal variations of the echo path 9; the estimated echo path $65_k$ is iteratively estimated by an estimation part $67_k$ using a complex projection or complex ES projection algorithm so that the residual $E_k(m)=Y_k(m)-\hat{Y}_k(m)$ approaches zero, and the estimated echo path is adjusted accordingly—this ensures an optimum echo cancellation at all times.

The error signals $E_k(m)$ in the respective subbands are combined by a subband synthesis part 63 into a full band signal e(t). This division/synthesis process can efficiently be carried out using an N point FFT.

Figure 15:
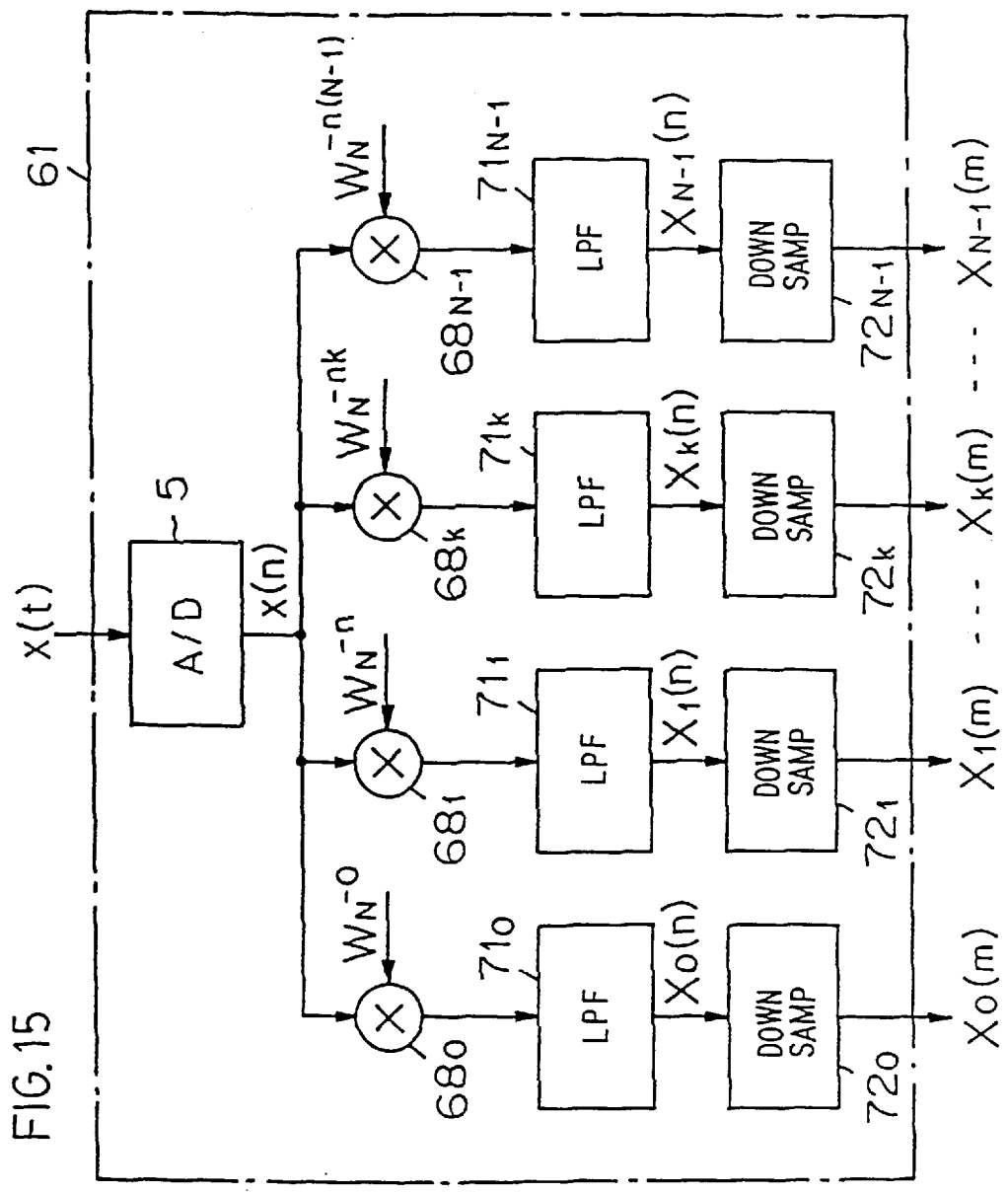
FIG. 15 is a block diagram illustrating an example of the functional configuration of a subband analysis part 61 in FIG. 14.
Figure 16:
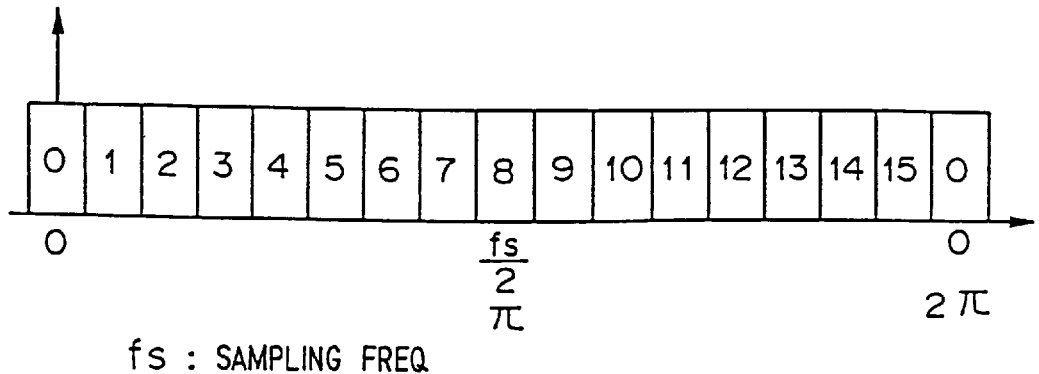
FIG. 16 is a diagram showing an example of a subband signal.

FIG. 15 illustrates the internal configuration of the subband analysis part 61, wherein the received signal x(t) is sampled by the A/D converter 5, then the sampled received signals x(n) are each multiplied by a multiplier $68_k$ by $W_N^{-nk}=\exp\{-j2\pi nk/N\}$, and the multiplied output is band limited by a low-pass filter $71_k$ of a pass band width from $-\pi/N$ to $\pi/N$, and hence is divided into N subbands. The thus band-limited signal $X_k(n)$ is down sampled with the down sampling ratio M to obtain the subband signal $X_k(m)$. The subband signals $X_0(m)$ to $X_{N-1}(m)$ of the full band correspond to a short-time spectrum. In FIG. 16 there are shown subbands when N=16. Of the 16 subband signals, the signals 0 and 8 are real numbers and the other signals are complexes. The subbands symmetrical with respect to the subband 8 (subbands 7 and 9, for example) bear a complex conjugate relation to each other, and the full band signal could be synthesized by a total of nine subband signals (two real numbers and seven complexes).

Figure 17:
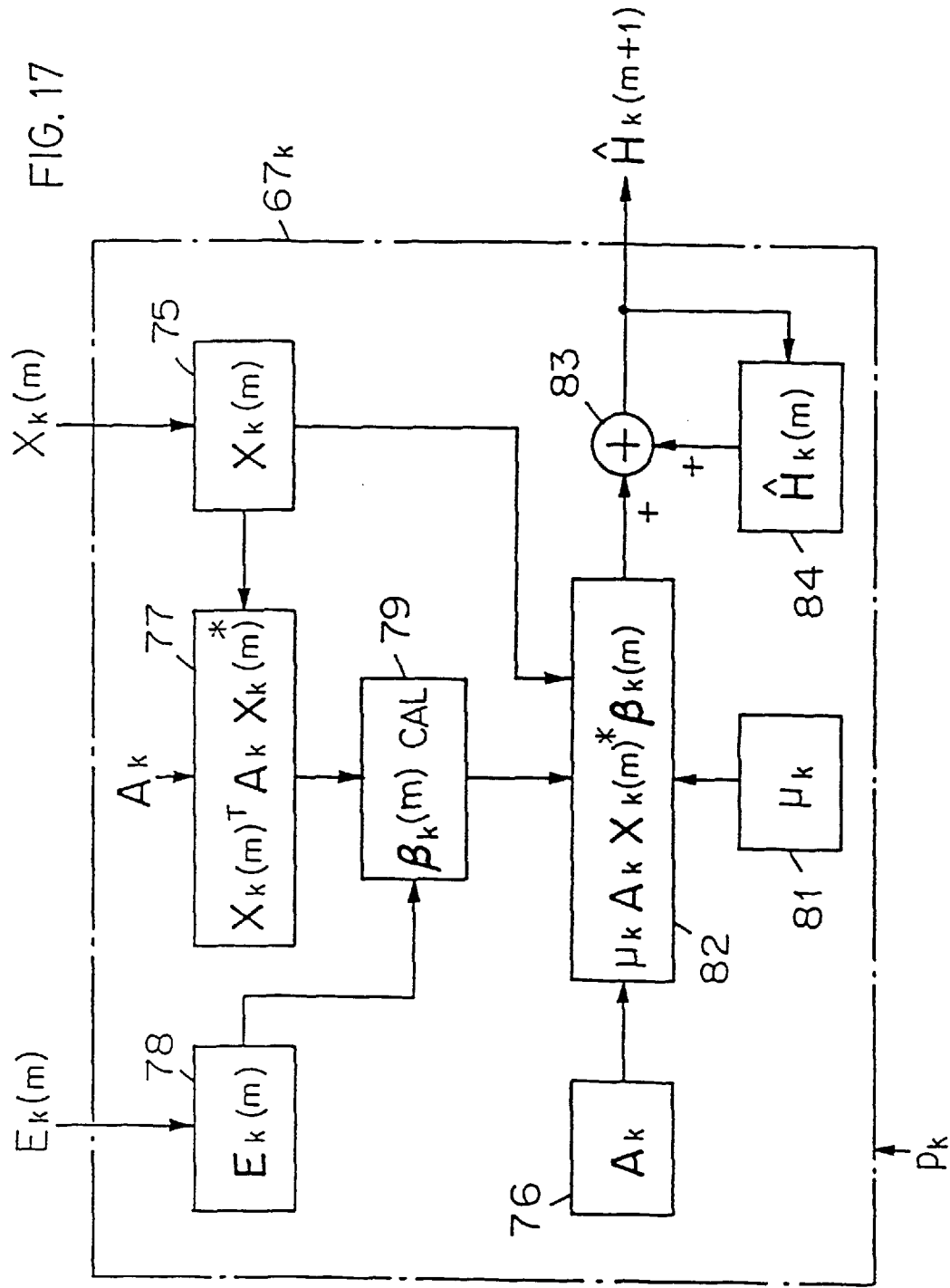
FIG. 17 is a block diagram illustrating an example of the functional configuration of a k-th subband estimation part $67_k$ in FIG. 14.

FIG. 17 illustrates an example of the internal configuration of the k-th subband estimation part $67_k$ which uses the $p_k$-th order complex ES projection algorithm (complex projection algorithm when A=I).

The subband received signal $X_k(m)$ is fed to a received signal storage part 75, wherein it is rendered to the subband received signal matrix $X_k(m)$. In a step size matrix storage part 76 there is stored the first step size matrix $A_k$. The step size matrix $A_k$ is weighted with the impulse response variation characteristic in the corresponding subband. In an ordinary room, the impulse response variation in the k-th subband is expressed as an exponential function using an attenuation ratio $\gamma_k$. An auto-correlation calculating part 33 calculates an auto-correlation matrix $X_k(m)^T A_k X_k^*(m)$ of the subband received signal matrix $X_k(m)$ weighted with the first step size matrix $A_k$, where * represents a complex conjugate. The thus calculated auto-correlation matrix and the residual $E_k(m)$ are fed to a $\beta_k(m)$ calculating part 79 to solve the following simultaneous linear equation with $p_k$ unknowns to obtain the constant $\beta_k(m)$.

$$[X_k(m)^T A_k X_k^*(m)]\beta_k(m)=E_k(m) \tag{24}$$

To avoid instability in the inverse matrix operation, a small positive constant $\delta_k$ is used as follows:

$$[X_k(m)^T A_k X_k(m)+\delta_k I]\beta_k(m)=E_k(m) \tag{24'}$$

where I represents a unit matrix.

The first step size matrix $A_k$, the received signal vector matrix $X_k(m)$, the constant $\beta_k(m)$ and the step size $\mu_k$ from a step size storage part 81 are provided to an adjusted information generating part 82 to calculate the following equation.

$$\mu_k A_k X_k^*(m)\beta_k(m) \tag{25}$$

The calculated output is fed to an adder 83, wherein it is added to the coefficient vector $\hat{H}_k(m)$ from a tap coefficient storage part 84 to obtain $\hat{H}_k(m+1)$. The calculated result $\hat{H}_k(m+1)$ is provided to the estimated echo path $6_k$ and, at the same time, it is fed to the tap coefficient storage part 84 to update the value stored therein.

By the above-described operation, the estimated echo path $6_k$ is iteratively updated following equation (26) and the impulse response $\hat{H}_{K(m)}$ of the estimated echo path $6_k$ approaches the impulse response $H_k(m)$ of the true echo path 9.

$$\hat{H}_k(m+1)=\hat{H}_k(m)+\mu_k A_k X_k^*(m)\,\beta_k(m) \tag{26}$$

where $A_k=\mathrm{diag}[\alpha_{k1},\alpha_{k2}, \ldots, \alpha_{kLk}]$ : step size matrix in the k-th subband $\alpha_{ki}=\alpha_{ko}\gamma_k^{i-1}$ (i=1, 2, ... , $L_K$)

$\gamma_k$: attenuation ratio of the impulse response variation in the k-th subband $L_k$: number of taps in the k-th subband $\hat{H}_k(m)=[\hat{h}_{k1}(m),\hat{h}_{k2}(m), \ldots, \hat{h}_{kLk}(m)]^T$ : estimated echo path (FIR filter) coefficient in the k-th subband $E_k(m)=[E_k(m),(1-\mu_k)E_k(m-1), \ldots, (1-\mu_k)^{pk-1}E_k(m-p_k+1)]^T$ $E_k(m)=Y_k(m)-\hat{H}_k(m)^T x_k(m)$ : estimation error in the k-th subband $X_k(m)=[x_k(m), x_k(m-1), \ldots, x_k(m-p_k+1)]$ $X_k(m)=[x_k(m),x_k(m-1), \ldots, x_k(m-L_k+1)]^T$ : received signal vector in the k-th subband $\beta_k(m)=[\beta_{k1}, \beta_{k2}, \ldots, \mu_{kpk}]^T$ $\mu_k$: second step size (scalar quantity) in the k-th subband

*: complex conjugate As is the case with the FIG. 4 embodiment, the number of taps in each subband has been reduced by down sampling. The spectrum differs with the subbands. As a result, the lowest order of the complex (ES) projection algorithm for whitening (flattening) the signal in each subband also differs with the subbands. The order $p_k$ of the projection algorithm in each subband can be determined by the same methods as the three schemes described above in respect of the FIG. 4 embodiment.

Figure 18:
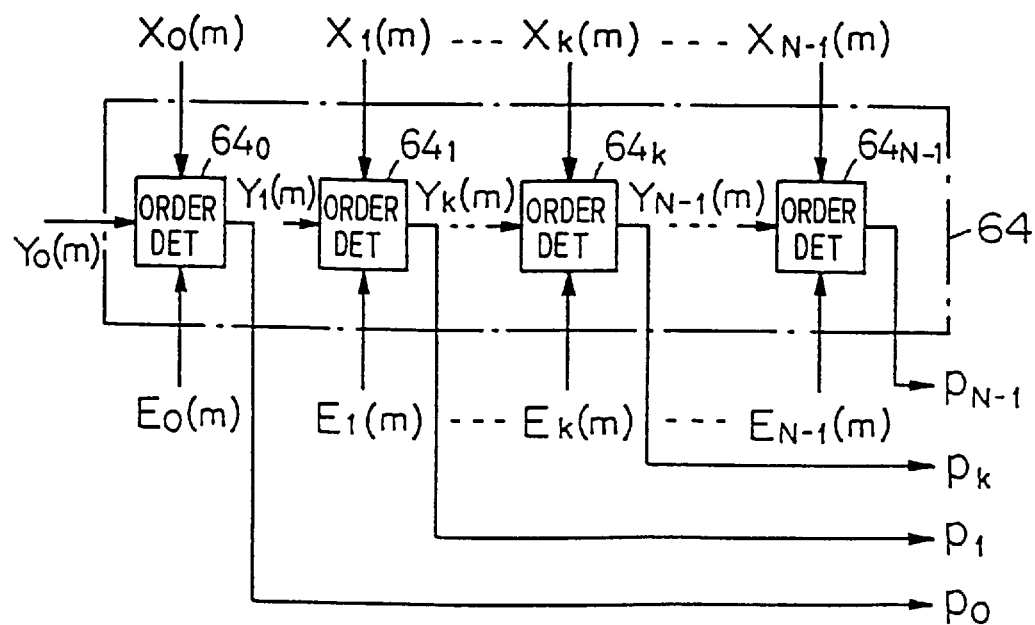
FIG. 18 is a block diagram illustrating an example of the configuration of an order determination control part 64 for use in the application of the first or second order determining scheme in FIG. 14.

FIG. 18 illustrates an example of the functional configuration of the order determination control part 64 in FIG. 14 which is used for the application of the first or second order determining scheme. There are provided order determining parts $64_0$ to $64_{N-1}$ respectively corresponding to the subbands. Each order determining part $64_k$ is supplied with the subband complex received signal $X_k(m)$, the subband complex echo $Y_k(m)$ and the complex error signal $E_k(m)$ and, as in the case of FIG. 8, it determines the order $p_k$ of the complex (ES) projection algorithm as described below.

With the first and second schemes, the convergence of the ERLE value $r_s=20\log_{10}(Y_s/E_s)$, calculated from $Y_k=Y_s$ and $E_k=E_s$, is observed with the order $p_k$ changed to $p_k=p_s$, where s=1,2, . . . As the order ps becomes higher, the degree of whitening increases and the convergence speed approaches a point of saturation as depicted in FIG. 9. The order $p_k=p_s$, at the time when the convergence speed is decided to have become sufficiently saturated, is set in the estimation part $67_k$. That is, in the case of using the first scheme, as described previously with respect to FIG. 9, the ERLE value $r_s=20\log_{10}(Y_s/E_s)$ at a predetermined time $m_k$ after the start of echo cancellation is calculated for each order $p_s$, and the order $p_s$, at the time when the ratio, $R_s=(r_s-r_{s-1})/(p_s-p_{s-1})$, of the difference between the current and immediately preceding ERLE values $r_s$ and $r_{s-1}$, to the difference between the current and immediately preceding orders $p_s$ and $p_{s-1}$ becomes smaller than the threshold value $R_{th}$, is determined to be the order $p_k$ of the projection algorithm. In the case of the second scheme, the time $m_s$ at which the ERLE value $r_s=20\log_{10}(Y_s/E_s)$ reaches the predetermined value $r_k$ after the start of echo cancellation is calculated for each order, and the order $p_s$, at the time when the ratio, $R=(m_{s-1}-m_s)/(p_s-p_{s-1})$, of the difference between the times $m_s$ and $m_{s-1}$ detected in the echo cancellation of the current and immediately preceding orders $p_s$ and $p_{s-1}$ to the difference between the current and immediately preceding orders $p_s$ and $p_{s-1}$ becomes smaller than the threshold value $R_{th}$, is determined to be the order $p_k$ of the projection algorithm.

Figure 19:
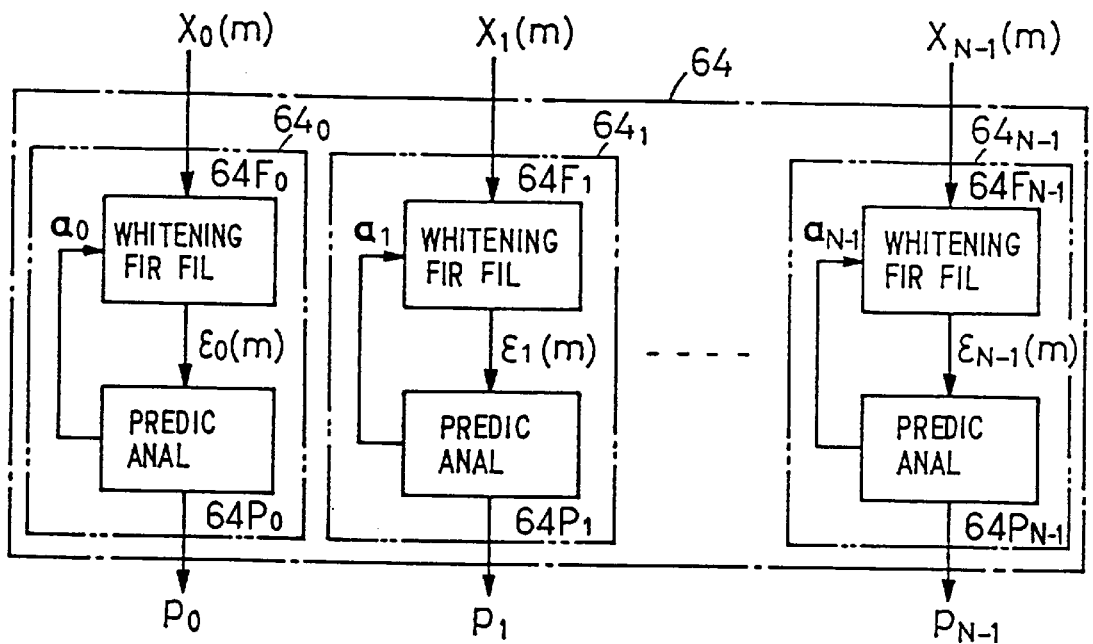
FIG. 19 is a block diagram illustrating an example of the configuration of the order determination control part 64 for use in the application of the third order determining scheme in FIG. 14.

FIG. 19 illustrates an example of the configuration of the order determination control part 64 for use in the application of the third order determining scheme in FIG. 14. As in the case of FIG. 12, the order determining part $64_k$ (k=0,1, . . . , N−1) in each subband is formed by a $(p_k-1)$-th whitening FIR filter $64F_k$ and an LPC analysis part $64P_k$. The subband complex signal $X_k$ is applied to the $(p_k-1)$-th whitening FIR filter $64F_k$, then an LPC analysis is made by the LPC analysis part $64P_k$ to determine the prediction coefficient $a_{ki}$ (where i=1, 2, . . . , $p_k$−1), and the estimation error vector $\epsilon_k(m)$ is calculated from $X_k(m)a_k(m)$. Further, the covariance matrix $Q_k(m)=\epsilon_k(m)\epsilon_k(m)^T$ of the estimation error vector is calculated, then its $L_k$ eigen values are calculated, and the ratio $C_s=\lambda_{max}/\lambda_{min}$ between the maximum and minimum ones of the eigen values are calculated. This ratio $C_s$ becomes smaller as the order $p_s$ becomes higher, and the order $p_s$ at the time when the ratio $C_s$ becomes smaller than the predetermined value $C_{th}$ is determined to be the order $p_k$ of the projection algorithm.

As in the FIG. 4 embodiment, it is also possible to determine the orders $p_k$ of the projection algorithm with respect to various speech sounds, various numbers N of subbands and the number of taps $L_k$ and prestore a standard value of the order $p_k$ in a ROM so that it is provided to the estimation part $6_k$ from the ROM, for example at turn-on. When using the DSP to construct the echo canceler, the order of the (ES) projection algorithm cannot be raised up to the level of complete whitening in many instances because of real-time constraints. In such a case, the order $p_k$ in each subband is determined so that the echo canceler attains the highest level of performance as a whole within a given operation time.

As described above, by setting the order of the complex (ES) projection algorithm in each subband to the optimum order, the whitening effect by raising the order of the (ES) projection algorithm can sufficiently be produced; hence, an echo canceler of fast convergence can be implemented.

Furthermore, since the room reverberation time is usually long in the low frequency band and short in the high frequency band, it is preferable to set the number of taps $L_k$ of the estimated echo path in the low frequency band large and the number of taps in the high frequency band small, and hence to set the projection order $p_k$ in the low frequency band high and the projection order in the high frequency band low. Moreover, in the low frequency band the number of taps $L_k$ is preferably set large and hence the order $p_k$ of the projection algorithm is also set sufficiently large through utilization of the fact that, in the case of a speech signal, for example, the signal energy concentrates in the low frequency band regardless of age or sex, as shown in FIG. 7; thus, in the high frequency band, it is possible to decrease the number of taps $L_k$ and set the order $p_k$ of the projection algorithm low. Furthermore, it is possible to set the number of taps in the low frequency band large and hence the projection order high and set the number of taps in the high frequency band small and hence the projection order low by making use of the fact that the human hearing sensitivity is usually high in the low frequency band and low in the high frequency band. By setting the number of taps $L_k$ in the high frequency band small or the projection order low as mentioned above, the computational complexity of the entire projection algorithm can be reduced. In the case of speech, the frequency band is divided into, for example, 32 subbands; the projection order is set to 16 in the first and second lowest subbands, 8 in the third and fourth subbands, 4 in the fifth to eighth subbands, 2 in the ninth to 16th subbands and 1 in the remaining higher subbands.

Incidentally, it is considered to be practical in the above that the number N of the subbands is in the range of 32 to 64; when the number of subbands is too large, the delay increases. The frequency band need not always be divided into subbands of different widths as shown in FIG. 7 but it may be divided into subbands of the same width. The scheme 1 for the determining the optimum order $p_k$ in each subband is free from errors.

Figure 20:
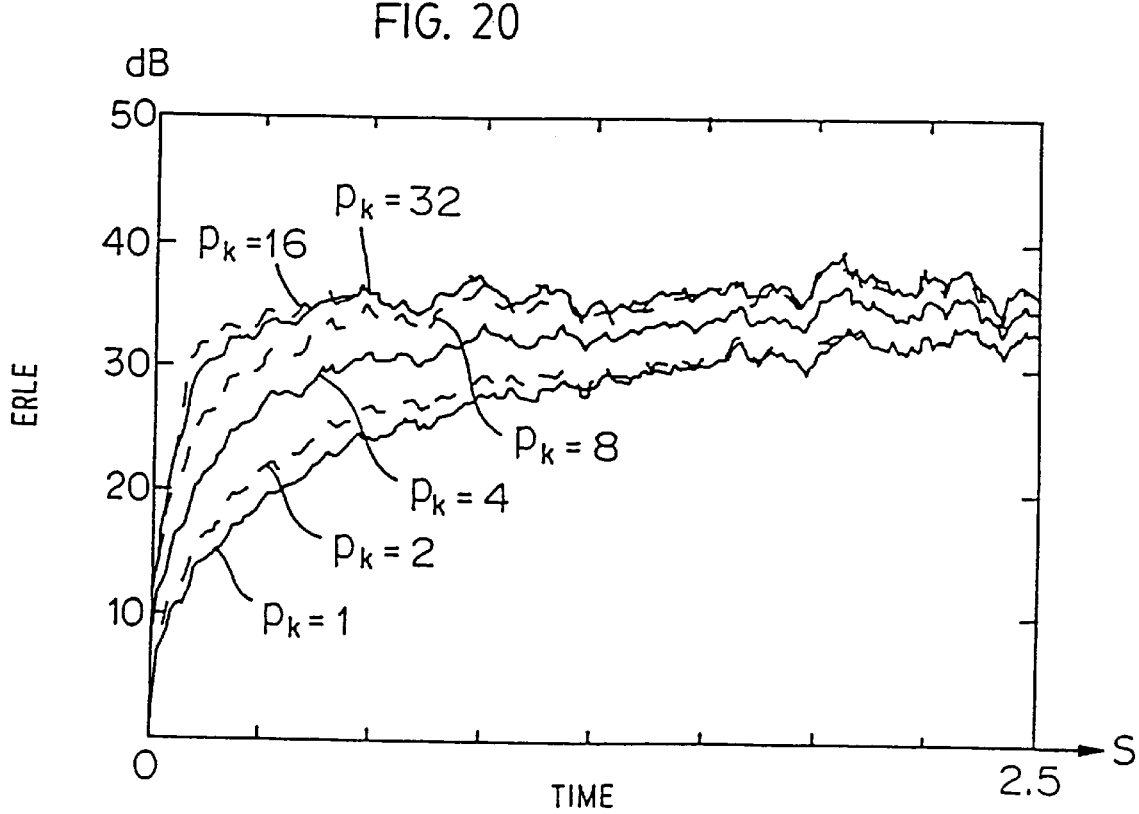
FIG. 20 is a graph showing simulation results on the ERLE convergence according to the present invention.

In FIG. 20 there are shown computer simulation results on the convergence characteristic in the echo cancellation by real-number signals $x_k(m)$ and $Y_k(m)$ band-limited by the SSB method set forth in the aforementioned literature by Crochiere and Rabiner in place of the band limitation by the band-pass filters $20_0$ to $20_{N-1}$ in the subband analysis part 51 and 51 in FIG. 4. (The analysis part 52 is identical in configuration with the part 51 and is not shown.) In the computer simulations a measured impulse response (512 taps and 16-kHz sampling frequency) was used. The number N of subbands is 32 and the down sampling ratio M is 8. The number of tap in each subband is 64. A speech signal was used as the received signal. A near-end noise was added to the echo so that the SN ratio=35 dB. The order of the projection algorithm is $p_k$=1, 2, 4, 8, 16, 32. The second step size $\mu_k$ was adjusted so that the steady-state ERLEs became equal.

From FIG. 20 it is seen that the convergence speed increases as the order $p_k$ of the projection algorithm becomes higher. That is, in the conventional projection and ES projection algorithm which do not divide the frequency band, the convergence speed does not increase even if the order is set to 2 or more, but according to the present invention, the convergence speech can be increased by raising the order of the projection algorithm. In addition, the convergence speed by the present invention is appreciably higher than that by the conventional frequency dividing method in which the signal is whitened by the frequency division processing, but the convergence speed is increased by further whitening by the projection or ES projection algorithm—this effect is hard to be expected in the past. As seen from FIG. 20, the whitening (flattening) is completed at $p_k$=16, 32, and the convergence speed is saturated and the convergence speed is close to the limit value. Accordingly, the order $p_k$ in this example, is enough to be 16 or 32 or so. Thus, according to the present invention, fast convergence can be obtained with the low-order (ES) projection algorithm. In the hands-free communication system, the echo path undergoes many variations due to the movement of persons, and it is a big advantage that the echo canceler is quickly adaptable to such changes.

Besides, by determining an appropriate order in each subband, fast convergence can be implemented with smaller computational complexity.

It will be apparent that many modifications and variations may be effected without departing from the scope of the novel concepts of the present invention.

What is claimed is:

1. A subband echo cancellation method which outputs a received signal to an echo path and, at the same time, inputs it into an estimated echo path to generate an echo replica and subtracts it from an echo picked up via said echo path to cancel said echo, said method comprising the steps of:

(a) dividing said received signal and said echo into N subbands to generate N subband received signals and N subband echoes, N being an integer equal to or greater than 2;

(b) generating N echo replicas by providing said N subband received signals to N estimated echo paths each formed by a digital filter which is given a filter coefficient of a predetermined number of taps and simulates the impulse response of said echo path in each of said N subbands;

(c) subtracting said N echo replicas from said N subband echoes corresponding thereto to generate echo cancellation error signals in said N subbands;

(d) iteratively adjusting the filter coefficients of said digital filters, by a projection or ES projection algorithm with an optimum order for each subband in a manner to minimize said N echo cancellation error signals on the basis of said N echo cancellation error signals and said N subband received signals corresponding thereto; and (e) combining said echo cancellation error signals in said N subbands into a send signal of the full band with said echo suppressed.

2. The method of claim 1, wherein said subband received signals and said subband echoes are real-number signals and said filter coefficients adjusted by said projection or ES projection algorithm are real-number coefficients.

3. The method of claim 1, wherein said subband received signals and said subband echoes are complex signals and said filter coefficients adjusted by said projection or ES projection algorithm are complex coefficients.

4. The method of any one of claims 1 to 3, wherein the order of said projection or ES projection algorithm in each of said N subbands is set to the minimum value at which the convergence speed of the echo return loss enhancement substantially saturates with respect to said received signal in said each subband.

5. The method of any one of claims 1 to 3, wherein the order of said projection or ES projection algorithm in each of said N subbands is set to the minimum value at which whitening of an estimation error vector at the time of having whitened said received signal by a linear predictive coding filter substantially saturates.

6. The method of any one of claims 1 to 3, wherein said step of generating said N subband received signals and said N subband echoes includes the step of dividing said received signal and said echo into N subbands and then down sampling signals with predetermined down sampling ratios, respectively.

7. The method of any one of claims 1 to 3, wherein the number of taps of said digital filter forming said estimated echo path in each of said N subbands is predetermined on the basis of at least one of the room reverberation characteristic, the energy distribution in the frequency region of a desired received signal, and the human psycho-acoustic characteristic.

8. The method of any one of claims 1 to 3, wherein the number of taps of said digital filter corresponding to a lower one of said N subbands is larger than the number of taps corresponding to a higher subband.

9. The method of claim 8, wherein the order of said projection or ES projection algorithm in said lower subband is set larger than the order of said projection or ES projection algorithm in said higher subband.

* * * * *